US011395159B2

(12) United States Patent
Lee et al.

(10) Patent No.: US 11,395,159 B2
(45) Date of Patent: Jul. 19, 2022

(54) DEVICE AND METHOD FOR CHANNEL FORECAST IN WIRELESS COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Byungju Lee, Gyeonggi-do (KR); Chahyeon Eom, Seoul (KR); Hyojin Lee, Gyeonggi-do (KR); Chungyong Lee, Seoul (KR); Jaehyun Lee, Gyeonggi-do (KR); Sanggeun Lee, Seoul (KR)

(73) Assignees: Samsung Electronics Co., Ltd; Industry-Academic Cooperation Foundation, Yonsei University

( * ) Notice: Subject to any disclaimer, the term of this patent is extended or adjusted under 35 U.S.C. 154(b) by 194 days.

(21) Appl. No.: 16/918,420

(22) Filed: Jul. 1, 2020

(65) Prior Publication Data

US 2021/0006989 A1 Jan. 7, 2021

(30) Foreign Application Priority Data

Jul. 1, 2019 (KR) .................. 10-2019-0078854

(51) Int. Cl.
*H04W 24/02* (2009.01)
*G06N 20/00* (2019.01)

(52) U.S. Cl.
CPC .......... *H04W 24/02* (2013.01); *G06N 20/00* (2019.01)

(58) Field of Classification Search
CPC ......... H04W 24/02; G06N 20/00; G06N 3/08; H04B 17/3913; H04B 17/24;
(Continued)

(56) References Cited

U.S. PATENT DOCUMENTS 10,581,640 B2 3/2020 Liu et al.
2014/0254534 A1* 9/2014 Zhang ................ H04L 27/2647
370/329
(Continued)

FOREIGN PATENT DOCUMENTS

| KR | 101673180 | 11/2016 |
|----|-----------|---------|
| KR | 20190038944 | 4/2019 |
| KR | 101979394 | 5/2019 |

OTHER PUBLICATIONS

"Deep Learning-assisted Multi-Dimensional Modulation and Resource Mapping for Advanced OFDM Systems"; Kim et al.; 2018 IEEE Globecom Workshops (GC Wkshps); Dec. 9-13, 2018 (Year: 2018).*

(Continued)

*Primary Examiner* — Benjamin H Elliott, IV
(74) *Attorney, Agent, or Firm* — The Farrell Law Firm, P.C.

(57) ABSTRACT

The disclosure relates to a pre-5th-generation (5G) or 5G communication system to be provided for supporting higher data rates beyond 4th-generation (4G) communication system such as long term evolution (LTE). The method includes identifying whether a channel forecast value is valid, the channel forecast value being acquired based on applying a learning algorithm to an input comprising channel values estimated based on first reference signals (RSs) received from a base station, transmitting, to the base station, an RS request message for requesting an update of the learning algorithm, based on the determining that the channel forecast value is invalid, receiving, from the base station, second RSs of an RS density determined based on the RS request message, generating an updated learning algorithm based on channel values estimated from the second RSs, and transmitting channel forecast information acquired based on the updated learning algorithm to the base station.

20 Claims, 19 Drawing Sheets

(58) Field of Classification Search
CPC . H04L 25/0204; H04L 41/16; H04L 25/0202; H04L 47/823; H04Q 2213/343

See application file for complete search history.

(56) References Cited

U.S. PATENT DOCUMENTS

| | | | |
|---|---|---|---|
| 2016/0113010 A1* | 4/2016 | Asplund | H04W 72/042 370/280 |
| 2017/0367105 A1* | 12/2017 | Kim | H04W 72/1289 |
| 2019/0199552 A1* | 6/2019 | Liu | H04W 72/04 |
| 2020/0106502 A1* | 4/2020 | Wang | H04B 17/24 |
| 2020/0106581 A1* | 4/2020 | Nammi | H04L 27/2649 |
| 2021/0006989 A1* | 1/2021 | Lee | G06N 3/08 |
| 2021/0385666 A1* | 12/2021 | Ramiro Moreno | H04B 7/0452 |

OTHER PUBLICATIONS

"Downlink Capacity Improvement of Closed-loop MU-MIMO by CSI Prediction"; Suzuki; 2013 International Conference on ICT Convergence (ICTC); Oct. 14-16, 2013 (Year: 2013).*

"Neural Network-Based Wireless Channel Prediction"; Jiang; Dec. 13, 2019 (Year: 2019).*

Final Report of 3GPP TSG RAN WG1 #97 v1.0.0; 3GPP TSG RAN WG1 Meeting #98 R1-1907973 Prague, Czech Rep, Aug. 26-30, 2019 (Year: 2019).*

"Multi-Antenna Fading Channel Prediction Empowered by Artificial Intelligence"; Jiang et al.; 2018 IEEE 88th Vehicular Technology Conference (VTC-Fall); Aug. 27-30, 2018 (Year: 2018).*

"Neural Network-Based Fading Channel Prediction: A comprehensive Overview"; Jiang et al.; Special Section on Artificial Intelligence for Physical-Layer Wireless Communications; Aug. 26, 2019 (Year: 2019).*

"Recurrent Neural Network-based Frequency-Domain Channel Prediction for Wideband Communications"; Jiang et al.; 2019 IEEE 89th Vehicular Technology Conference (VTC2019-Spring); Apr. 28-May 1, 2019 (Year: 2019).*

Korean Patent Office (screenshot) of Korean application from instant application, retrieved from the Internet on Mar. 2, 2022 (Year : 2022).*

Zhao, Yisheng et al., "Echo State Network for Fast Channel Prediction in Ricean Fading Scnearios", IEEE Communications Letters, vol. 21, No. 3, Mar. 2017, pp. 672-675.

Ding, Tianben et al., "Fading Channel Prediction based on Combination of Complex-valued Neural Networks and Chirp Z-Transform", IEEE Transactions on Neural Networks and Learning Systems, vol. 25. No. 9, Sep. 2014, pp. 1686-1695.

Liu, Wei et al., "Recurrent Neural Network based Narrowband Channel Prediction", Copyright 2006 IEEE, pp. 2173-2177.

3GPP TS 36.211 V12.2.0, 3rd Generation Partnership Project; Technical Specification Group Radio Access Network; Evolved Universal Terrestrial Radio Access (E-UTRA); Physical channels and modulation (Release 12), Jun. 2014, pp. 121.

Pan, Sinno Jialin et al., "A Survey on Transfer Learning", IEEE Transactions On Knowledge and Data Engineering, vol. 22, No. 10, Oct. 2010 pp. 1345-1359.

Shin, Hoo-Chang et al., "Deep Convolutional Neural Networks for Computer-Aided Detection CNN Architectures, Dataset Characteristics and Transfer Learning", IEEE Transactions on Medical Imaging, vol. 35, No. 5, May 2016, pp. 1285-1298.

* cited by examiner

DEVICE AND METHOD FOR CHANNEL FORECAST IN WIRELESS COMMUNICATION SYSTEM

CROSS-REFERENCE TO RELATED APPLICATION(S)

This application is based on and claims priority under 35 U.S.C. 119 to Korean Patent Application No. 10-2019-0078854, filed on Jul. 1, 2019 in the Korean Intellectual Property Office, the disclosure of which is herein incorporated by reference in its entirety.

BACKGROUND

1. Field

The present disclosure relates generally to a wireless communication system and, more particularly, to a device and method for channel forecasting in a wireless communication system.

2. Description of Related Art

To meet the demand for wireless data traffic since deployment of 4th generation (4G) communication systems, efforts have been made to develop an improved 5th generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a wireless communication system, a terminal may perform channel estimation based on reference signals (RSs) received from a base station, and may report a result of the channel estimation to the base station. The base station may receive the result of the channel estimation, and may perform link adaptation according to the received result. However, for better link adaptation, it is necessary to perform channel estimation for a time period in which RSs are not transmitted, and in particular, channel estimation for a future time period, in which RSs have not yet been transmitted, needs to be performed.

SUMMARY

The present disclosure has been made to address at least the disadvantages described above and to provide at least the advantages described below.

In accordance with an aspect of the present disclosure, a method of a terminal in a wireless communication system is provided. The method includes identifying whether a channel forecast value is valid, the channel forecast value being acquired based on applying a learning algorithm to an input comprising channel values estimated based on first reference signals (RSs) received from a base station, transmitting, to the base station, an RS request message for requesting an update of the learning algorithm, based on the determining that the channel forecast value is invalid, receiving, from the base station, second RSs of an RS density determined based on the RS request message, generating an updated learning algorithm based on channel values estimated from the second RSs; and transmitting channel forecast information acquired based on the updated learning algorithm to the base station.

In accordance with an aspect of the present disclosure, a method of a base station in a wireless communication system is provided. The method includes transmitting first reference signals (RSs) to a terminal, receiving, from the terminal, an RS request message for requesting an update of a learning algorithm when a channel forecast value is invalid, the channel forecast value being acquired by applying the learning algorithm to an input comprising channel values estimated based on the first RSs, determining an RS density based on the RS request message, transmitting second RSs of the RS density for updating the learning algorithm to the terminal, and receiving, from the terminal, channel forecast information acquired based on the updated learning algorithm.

In accordance with an aspect of the present disclosure, a terminal in a wireless communication system is provided. The terminal includes at least one transceiver, at least one processor operably coupled to the at least one transceiver and configured to identify whether a channel forecast value is valid, the channel forecast value being acquired based on applying a learning algorithm to an input comprising channel values estimated based on first reference signals (RSs) received from a base station, and transmit, to the base station, an RS request message for requesting an update of the learning algorithm, based on determining that the channel forecast value is invalid, receive, from the base station, second RSs of an RS density determined based on the RS request message, generate an updated learning algorithm based on channel values estimated from the second RSs, and transmits channel forecast information acquired based on the updated learning algorithm to the base station.

In accordance with an aspect of the present disclosure, a terminal in a wireless communication system is provided. The base station includes at least one transceiver, at least one processor operably coupled to the at least one transceiver and configured to transmit first reference signals (RSs) to a terminal, receive, from the terminal, an RS request message for requesting an update of a learning algorithm when a channel forecast value is invalid, the channel forecast value being acquired by applying the learning algorithm to an input comprising channel values estimated based on the first RSs, determine an RS density based on the RS request message, transmit second RSs of the RS density for updating the learning algorithm to the terminal, and receive, from the terminal, channel forecast information acquired based on the updated learning algorithm.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
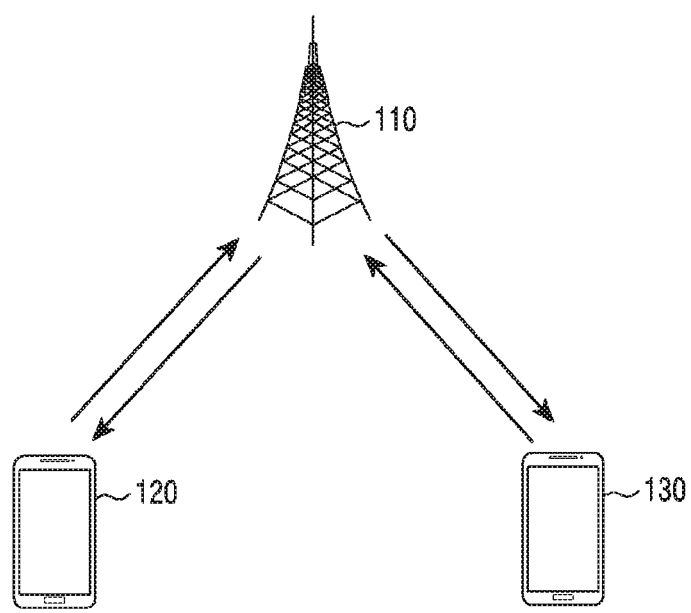
FIG. 1 illustrates a wireless communication system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

The disclosure describes various embodiments by using terms used in some communication specifications (e.g., 3rd generation partnership project (3GPP)), but this is merely illustrative. Various embodiments may also be easily modified and applied to other communication systems.

Definitions of terms used in various embodiments are as follows:

A "learning algorithm" is a machine learning and/or artificial intelligence (AI)-based algorithm, and refers to an algorithm learned to output a specific value for a specific input value according to a design parameter. "Learning" refers to determining and/or updating weights of the learning algorithm, and an output of the learning algorithm for an input of the learning algorithm may be acquired by applying the learning algorithm (or weights of the learning algorithm) to the input of the learning algorithm. Updating the learning algorithm may also be referred to as learning the learning algorithm. The learning algorithm may include a neural network (NN) algorithm, a deep neural network (DNN) algorithm, an AI algorithm and/or a machine learning algorithm.

"Learning phase" refers to a duration or phase in which additional RSs are transmitted for an update and/or learning of the learning algorithm.

"Learning data" refers to data required to update the learning algorithm. For example, the learning data may include an RS.

"Channel value" refers to a set of elements of a channel matrix and/or elements included in the channel matrix. The channel value may also be referred to as a channel coefficient, a channel, or a MIMO channel.

"Channel forecast value" is a forecasted channel value and refers to a channel value acquired according to channel forecasting.

"Channel forecast" refers to forecasting a channel value for a subsequent time interval(s) based on channel values estimated based on RSs received from a previous time interval(s), unlike channel estimation for estimation of a channel value for a particular time interval(s) based on RSs received from the time interval(s). An RS may include at least one of a cell-specific reference signal (CRS) or channel state information-reference signal (CSI-RS).

"Channel estimation value" is an estimated channel value and refers to a channel value acquired according to channel estimation.

"Time interval" refers to a unit interval for calculation of a channel value. For example, the time interval may include a symbol, a mini slot, a slot, a subframe, and/or a frame.

"Feature information" is terminal-specific information defined for each terminal, and may be information that reflects a distribution and/or characteristic of a channel for the terminal. For example, the feature information may include at least one of a position of the terminal, mobility of the terminal, whether the terminal is located indoors or outdoors, or whether the terminal is located in the center of a cell or located at a cell boundary (or a relative position of the terminal in the cell). The position of the terminal is a position expressed in three dimensions (3D), and may be determined based on a GPS. The mobility of the terminal may include a moving speed of the terminal, and may include a trajectory that the terminal has moved over time. The relative position of the terminal in the cell may be determined based on an intensity of a received signal received from a base station by the terminal. The feature information may be also referred to as a user feature.

"RS density" refers to the number of RSs in a predetermined frequency bandwidth, the number of RSs in a predetermined time interval, or the number of RSs in a predetermined frequency bandwidth and a predetermined time interval. The predetermined frequency bandwidth may be at least one resource block (RB). The RS density may be defined for each antenna port.

"RS transmission period" refers to a period in which RSs are transmitted by a base station. The RS transmission period may be expressed in units of time (e.g., ms) or may be expressed in the number of time intervals (e.g., N subframes or N slots).

"Learning support" refers to sharing weights of a learning algorithm, and may also be referred to as simply sharing the learning algorithm.

FIG. 1 illustrates a wireless communication system, according to an embodiment. FIG. 1 illustrates a base station 110, a terminal 120, and a terminal 130, as parts of nodes using a wireless channel in a wireless communication system. FIG. 1 illustrates only one base station, but may further include another base station that is the same as or similar to the base station 110.

The base station 110 is a network infrastructure that provides wireless access to the terminals 120 and 130. The base station 110 has coverage defined as a predetermined geographic area based on the distance over which a signal may be transmitted. The base station 110 may be referred to as, in addition to "base station", "access point (AP)", "eNodeB (eNB)", "5G node (5th generation node)", "next generation nodeB (gNB)", "wireless point", "transmission/reception point (TRP)", or other terms having equivalent technical meanings.

Each of the terminal 120 and the terminal 130 is a device used by a user, and performs communication with the base station 110 via the wireless channel. In some cases, at least one of the terminal 120 and the terminal 130 may be operated without involvement of a user. That is, at least one of the terminal 120 and the terminal 130 is a device that performs machine type communication (MTC) and may not be carried by a user. Each of the terminal 120 and the terminal 130 may be referred to as, in addition to "terminal", "user equipment (UE)", "mobile station", "subscriber station", "remote terminal", "wireless terminal", "user device", or other terms having equivalent technical meanings.

The terminal 120 may directly communicate with the terminal 130 without going through the base station. Such direct communication may be referred to as D2D communication or sidelink communication. A link established between terminals for D2D communication or sidelink communication may be referred to as a D2D link or a sidelink.

Figure 2:
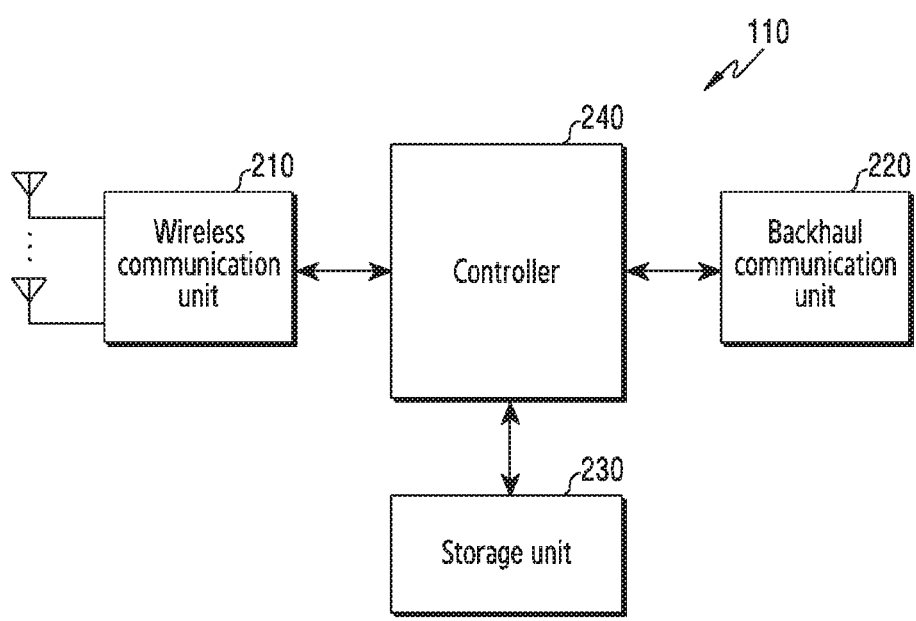
FIG. 2 illustrates a configuration of a base station in the wireless communication system, according to an embodiment.

FIG. 2 illustrates a configuration of a base station in the wireless communication system, according to an embodiment. The configuration illustrated in FIG. 2 may be understood as a configuration of the base station 110. The terms "~unit", "~device", etc. used hereinafter refer to a unit that processes at least one function or operation, which may be implemented by hardware or software, or a combination of hardware and software.

Referring to FIG. 2, the base station includes a wireless communication unit 210, a backhaul communication unit 220, a storage unit 230, and a controller 240.

The wireless communication unit 210 performs functions to transmit or receive a signal through a wireless channel. The wireless communication unit 210 performs conversion between a baseband signal and a bitstream according to a physical layer specification of a system. During data transmission, the wireless communication unit 210 generates complex symbols by encoding and modulating a transmission bitstream. When receiving data, the wireless communication unit 210 restores the received bitstream by demodulating and decoding the baseband signal.

Further, the wireless communication unit 210 up-converts the baseband signal to a radio frequency (RF) band signal, transmits the up-converted RF band signal via an antenna, and then down-converts the RF band signal received via the antenna to a baseband signal. To this end, the wireless communication unit 210 may include a transmission filter, a reception filter, an amplifier, a mixer, an oscillator, a digital-to-analog converter (DAC), an analog-to-digital converter (ADC), and the like. Also, the wireless communication unit 210 may include multiple transmission/reception paths. Further, the wireless communication unit 210 may include at least one antenna array including multiple antenna elements.

In terms of hardware, the wireless communication unit 210 may include a digital unit and an analog unit, wherein the analog unit includes multiple sub-units according to an operating power, an operating frequency, and the like. The digital unit may be implemented as at least one processor (e.g., a digital signal processor (DSP)).

The wireless communication unit 210 transmits and receives a signal as described above. Accordingly, all or a part of the wireless communication unit 210 may be referred to as a "transmitter", a "receiver", or a "transceiver". In the following description, transmission and reception performed via a wireless channel are used in a sense including processing performed as described above by the wireless communication unit 210.

The backhaul communication unit 220 provides an interface that performs communication with other nodes within a network. That is, the backhaul communication unit 220 converts, into a physical signal, a bitstream transmitted from a base station to another node, such as another access node, another base station, an upper node, the network, etc., and converts a physical signal received from another node into a bitstream.

The storage unit 230 stores data, such as a basic program, an application program, configuration information, and the like for operation of the base station. The storage unit 230 may include a volatile memory, a nonvolatile memory, or a combination of a volatile memory and a nonvolatile memory. The storage unit 230 provides stored data in response to a request of the controller 240.

The controller 240 controls overall operations of the base station. The controller 240 transmits and receives a signal via the wireless communication unit 210 or the backhaul communication unit 220. Further, the controller 240 records and reads data in the storage unit 230. The controller 240 may perform functions of a protocol stack required by the communication standard. The protocol stack may be included in the wireless communication unit 210. To this end, the controller 240 may include at least one processor.

The controller 240 may perform control to receive a message for requesting an update of a learning algorithm, transmit RSs for a learning phase to the terminal in response to the request, and receive, from the terminal, channel forecast information acquired based on the learning algorithm. The controller 240 may control the base station to perform operations described below.

Figure 3:
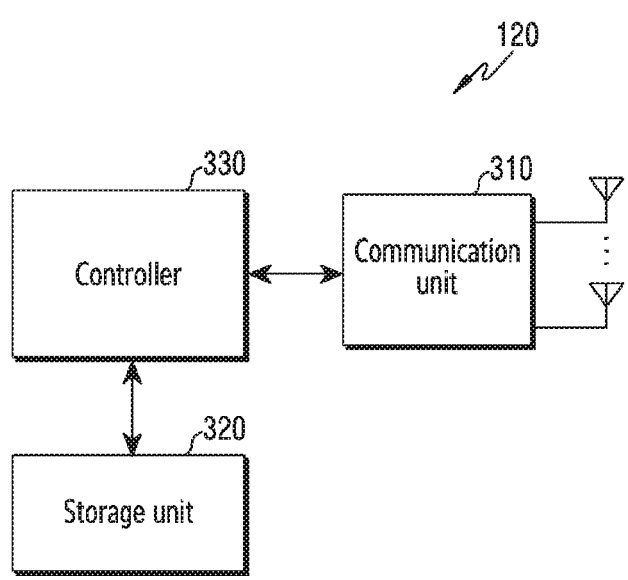
FIG. 3 illustrates a configuration of a terminal in the wireless communication system, according to an embodiment.

FIG. 3 illustrates a configuration of a terminal in the wireless communication system, according to an embodiment. The configuration illustrated in FIG. 3 may be understood as a configuration of the terminal 120. The terms "~unit", "~device", etc. used hereinafter refer to a unit that processes at least one function or operation, which may be implemented by hardware or software, or a combination of hardware and software.

Referring to FIG. 3, the terminal may include a communication unit 310, a storage unit 320, and a controller 330.

The communication unit 310 performs functions for transmitting or receiving a signal via a wireless channel. The communication unit 310 performs conversion between a baseband signal and a bitstream according to a physical layer specification of the system. During data transmission, the communication unit 310 generates complex symbols by encoding and modulating a transmission bitstream. When receiving data, the communication unit 310 restores the received bitstream by demodulating and decoding the baseband signal. The communication unit 310 up-converts the baseband signal into an RF band signal, transmits the up-converted RF band signal via an antenna, and then down-converts the RF band signal received via the antenna into a baseband signal. The communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented in a single package. The communication unit 310 may include a plurality of RF chains.

The communication unit 310 transmits and receives a signal as described above. Accordingly, all or a part of the communication unit 310 may be referred to as "transmitter", "receiver", or "transceiver". In the following description, transmission and reception performed via a wireless channel are used in a sense including processing performed as described above by the wireless communication unit 310.

The storage unit 320 stores data, such as a basic program, an application program, configuration information, and the like for operation of the terminal. The storage unit 320 may include a volatile memory, a nonvolatile memory, or a combination of a volatile memory and a nonvolatile memory. The storage unit 320 provides stored data in response to a request of the controller 330.

The controller 330 controls overall operations of the terminal. The controller 330 transmits and receives a signal via the communication unit 310. Further, the controller 330 records and reads data in the storage unit 320. The controller 330 may perform functions of a protocol stack required by the communication standard. To this end, the controller 330 may include at least one processor or a micro-processor, or may be a part of a processor. A part of the communication unit 310 and the controller 330 may be referred to as a communication processor (CP).

The controller 330 may perform control to verify validity of a learning algorithm, request an update of the learning algorithm, and perform channel forecasting based on the learning algorithm. The controller 330 may control the terminal to perform operations according to various embodiments described below.

In FIG. 3, the configuration of the terminal 120 is illustrated, but this is for the convenience of description, and the terminal 130 may also have the same configuration as that of the terminal 120. For the convenience of description below, operations of the terminal 120 are described, but operations of the terminal 120 may be performed in the same manner by the terminal 130.

Hereinafter, the disclosure relates to a device and method for channel forecasting in a time interval, in which no RS is transmitted, using a learning algorithm (e.g., DNN), and improving link adaptation performance by using a channel forecast value. Further, various embodiments of the disclosure propose a method for improving learning accuracy and learning efficiency for the learning algorithm, and, to this end, feature information for the terminal may be defined and utilized in various embodiments of the disclosure.

A technique for channel forecasting using an NN in the time domain may include a technique for forecasting a channel value in the time domain and a technique for forecasting and estimating a path parameter(s), such as an amplitude, a phase shift, and/or a Doppler frequency, in the frequency domain, so as to calculate a channel in the time domain.

A technique for directly forecasting a channel in the time domain is modeling a trend of a channel change over time, and therefore various NN structures, such as an echo state network (ESN) and/or a recurrent neural network (RNN) for effectively modeling the trend of the channel change in the time domain, may be used to perform channel forecasting. Further, a technique for forecasting a path parameter in the frequency domain and indirectly forecasting a channel of the time domain may include an operation of estimating the path parameter by using a method, such as a chirp z-transform, and NN may be used for modeling a trend of a change in the path parameter. If accurate estimation of the path parameter is possible, a technique for channel forecasting based on the estimated path parameter may have high accuracy.

An actual channel may be determined by multiple scatterers and paths. Therefore, a technique for directly forecasting a channel based on a single scattering environment in the time domain may have difficulty to apply a general channel (i.e., an actual channel). Further, in a technique for indirectly forecasting a channel in the frequency domain, accuracy of estimation of the path parameter may be influenced according to frequency resolution. Therefore, if the number of paths increases, the accuracy of estimation of the path parameter may decrease, and thus accuracy of channel forecasting may decrease. In other words, with respect to a general channel having a plurality of paths, if channel forecasting is performed in the frequency domain, the accuracy of channel forecasting may decrease.

Various embodiments provide a device and method for channel forecasting using a learning algorithm and improving link adaptation performance. In other words, the device and method according to various embodiments may enable improvement of link adaptation performance, by calculating channel state information (CSI) via channel forecasting in a time interval in which no RS is transmitted.

Hereinafter, a specific method for performing channel forecasting using a learning algorithm will be described.

Figure 4:
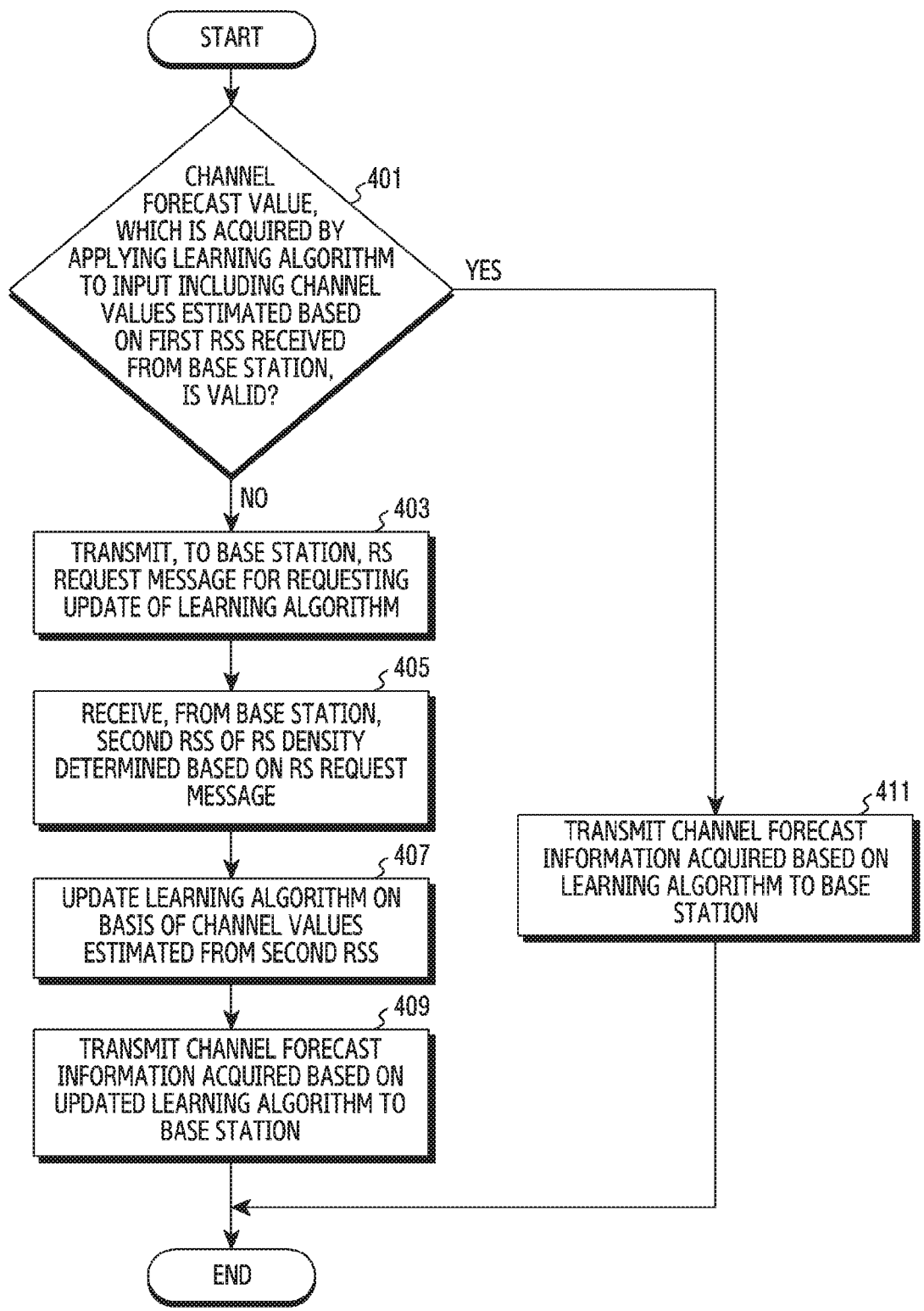
FIG. 4 illustrates a flowchart of the terminal in the wireless communication system, according to an embodiment.

FIG. 4 illustrates a flowchart of the terminal in the wireless communication system, according to an embodiment. FIG. 4 illustrates an operation method of the terminal 120.

Referring to FIG. 4, at step 401, a terminal may determine whether a channel forecast value is valid, the channel forecast value being acquired by applying a learning algorithm to an input including channel values estimated based on first RSs received from a base station. More specifically, the terminal may receive first RSs from the base station, may estimate channel values based on the received first RSs, may acquire a channel forecast value by applying a learning algorithm to an input including the estimated channel values, and may determine whether the acquired channel forecast value is valid. At step 401, the input of the learning algorithm may include the estimated channel values, and an output of the learning algorithm with respect to the input of the learning algorithm may include the channel forecast value. Application of the learning algorithm may include application of weights of the learning algorithm.

If the channel forecast value is invalid, the terminal may transmit, to the base station, an RS request message for requesting an update of the learning algorithm, at step 403. In other words, based on the determination that the channel forecast value is invalid, the terminal may transmit, to the base station, the RS request message for requesting an update of the learning algorithm. The update of the learning algorithm may refer to learning of the learning algorithm, and the weights of the learning algorithm may include a determination and/or updating operation. The RS request message may be a message for requesting a change in an RS density and/or an RS transmission period. For example, the terminal may request, via the RS request message, the base station to increase the RS density and/or decrease the RS transmission period.

At step 405, the terminal may receive, from the base station, second RSs of the RS density determined based on the RS request message. The RS density at which the second RSs are transmitted may be determined to be the same as the RS density indicated by the RS request message, or may be determined as an RS density preconfigured according to the number of times the RS request message is transmitted.

At step 407, the terminal may update the learning algorithm based on channel values estimated from the second RSs. More specifically, the terminal may estimate channel values based on the second RSs, and may update the learning algorithm based on the estimated channel values. Updating of the learning algorithm based on the estimated channel values may include, if the learning algorithm is applied to an input including channel estimation values for time intervals (t−N) to (t−1) (i.e., a channel estimation value for time interval (t−N), a channel estimation value for time interval (t−N+1), . . . , a channel estimation value for time interval (t−1)) among the estimated channel values, updating and/or determining the weights of the learning algorithm so that the output of the learning algorithm (i.e., a channel forecast value for time interval t) becomes a channel estimation value for time interval t from among the estimated channel values. Here, time intervals (t−N) to t may be adjacent to each other or may be separated by a predetermined period (e.g., an RS transmission period). Upon the update of the learning algorithm, the learning algorithm may be changed from a first learning algorithm to a second learning algorithm.

At step 409, the terminal may transmit channel forecast information acquired based on the updated learning algorithm to the base station. More specifically, the terminal may receive RSs from the base station, may estimate channel values based on the received RSs, may acquire a channel forecast value by applying the updated learning algorithm to the input including the estimated channel values, and may acquire and/or derive channel forecast information from the acquired channel forecast value. The channel forecast information may include CSI and/or a signal to interference plus noise ratio (SINR), and the CSI may include a channel quality indicator (channel quality information), a precoding matrix indicator (PMI), and/or a rank indicator (RI).

On the other hand, if the channel forecast value is valid, at step 411, the terminal may transmit, to the base station, the channel forecast information acquired and/or derived from the channel forecast value. In other words, if the channel forecast value is valid, the terminal may not update the learning algorithm, and may transmit the channel forecast information derived from the acquired channel forecast value to the base station.

The determining whether the channel forecast value is valid may include determining whether a difference between the channel forecast value and a channel value estimated in a time interval related to the channel forecast value falls within a threshold range. If the difference between the channel forecast value and the channel value estimated in the time interval related to the channel forecast value falls within the threshold range, the terminal may determine that the channel forecast value is valid. Alternatively, if the difference between the channel forecast value and the channel value estimated in the time interval related to the channel forecast value is out of the threshold range, the terminal may determine that the channel forecast value is invalid. More specifically, determining whether the channel forecast value is valid may include acquiring an output of the learning algorithm (i.e., a channel forecast value for time interval t) by applying the learning algorithm to an input including channel estimation values for time intervals (t−N) to (t−1) (i.e., a channel estimation value for time interval (t−N), a channel estimation value for time interval (t−N+1), . . . , a channel estimation value for time interval (t−1)), and determining whether a difference between a channel forecast value for time interval t and a channel estimation value for time interval t falls within the threshold range.

Determining whether the channel forecast value acquired by applying the learning algorithm is valid may be referred to as determining whether the learning algorithm is valid or verifying the learning algorithm.

The terminal may receive, from the base station, information indicating the RS density and/or RS transmission period determined based on the RS request message. Information indicating the determined RS density and/or RS transmission period may be received via a physical downlink control channel ((PDCCH) or downlink control information (DCI)), media access control (MAC) control element (CE) signaling, or radio resource control (RRC) signaling (or higher layer signaling). Based on the received information, the terminal may receive the second RSs of the indicated RS density from the base station, or may receive the second RSs of the indicated RS density from the base station in the indicated RS transmission period.

The terminal may update the learning algorithm at step 407, and then may perform step 409 if the updated learning algorithm is valid. Alternatively, if the updated learning algorithm is invalid, the terminal may return to step 403 and may transmit the RS request message to the base station to update the updated learning algorithm one more time. Whenever the terminal transmits an RS density indicator (RSDI), the RSDI may indicate a higher RS density.

The terminal may determine a required RS density based on the difference between the channel forecast value and the channel value estimated in a time interval related to the channel forecast value. In this case, the RS request message at step 403 may include the RSDI indicating the required RS density, and the terminal may receive, at step 405, the second RSs of the required RS density from the base station in the RS transmission period determined based on the RSDI. The time interval related to the channel forecast value refers to a time interval in which a channel value is forecasted. The terminal may determine the required RS density based on the difference between the channel forecast value for time interval t and the channel estimation value for time interval t. A difference between a channel forecast value for a time interval, which is acquired based on the learning algorithm, and a channel estimation value for the corresponding time interval may be related to a "level of learning". A high level of learning may mean that the difference between the channel forecast value and the channel estimation value is small, and a low level of learning may mean that the difference between the channel forecast value and the channel estimation value is large. If the difference between the channel forecast value and the channel estimation value is small (i.e., if a learning level of the terminal is high), the terminal may determine the required RS density to be a relatively low RS density. If the difference between the channel forecast value and the channel estimation value is large (i.e., if the learning level of the terminal is low), the terminal may determine the required RS density to be a relatively high RS density.

In various embodiments, the RS request message transmitted at step 403 may include an RS request (RSR) indicating that the learning algorithm is required to be updated. In this case, the terminal may receive, at step 405, second RSs of a preconfigured RS density corresponding to the RSR from the base station in a preconfigured RS transmission period corresponding to the RSR. The RSR may be a 1-bit signal to indicate that an update of the learning algorithm is required. A preconfigured RS density and a preconfigured RS transmission period corresponding to the RSR may exist, and multiple preconfigured RS densities and multiple preconfigured RS transmission periods may exist according to the number of times the RSR has been transmitted from the terminal. If the number of times the RSR is transmitted from the terminal is n (n=1, 2, ..., $N_{Max}$), a preconfigured RS density and a preconfigured RS transmission period corresponding to each n may exist. Here, $N_{Max}$ refers to a maximum value of the number of RSR transmissions in which the preconfigured RS density and the preconfigured RS transmission period may be defined.

The RS request message transmitted at step 403 may include at least one of the RSDI or RSR. If the RS density indicated by the RSDI is greater than or equal to a threshold RS density, or the number of times the RSR has been transmitted is greater than or equal to a threshold value (e.g., $N_{Max}$), the terminal may receive, from the base station, a stop flag for requesting at least one of stopping the update of the learning algorithm or stopping channel forecasting. If the terminal receives the stop flag, the terminal may not perform step 405 and subsequent steps thereof, and may not update the learning algorithm or may not perform channel forecasting.

The RS density and the RS transmission period may be determined based on the RS request message transmitted from the terminal and RS request messages transmitted from one or more other terminals in a cell of the base station. In this case, the terminal may receive the determined RS transmission period and an index indicating the RS configuration including the determined RS density from the base station. The terminal may receive one or more RS configurations from the base station via RRC signaling (or higher layer signaling), and each RS configuration may include information relating to an RS-mapped time-frequency resource, the RS density, and the RS transmission period. If the RS transmission period is included in the RS configuration, the terminal may receive the index indicating the RS configuration and may not receive the RS transmission period from the base station. After receiving one or more RS configurations, the terminal may receive, from the base station, the determined RS transmission period and/or the index indicating the RS configuration including the determined RS density, and may receive the second RSs of the RS density from the base station in the RS transmission period based on the index received at step 405. More specifically, the terminal may identify the RS density and/or the RS transmission period based on the index received from the base station, and may receive the second RSs of the identified RS density from the base station in the identified RS transmission period. The second RSs may be transmitted, from the base station, not only to the terminal but also to one or more other terminals in the cell of the base station.

The RS density and the RS transmission period may be determined based on the RS request message transmitted from the terminal and RS request messages transmitted from one or more other terminals in the cell of the base station. In this case, the terminal may receive information including an indicator indicating that the RS is transmitted in the time interval and an index indicating the RS configuration including the determined RS density, from the base station in the corresponding time interval. In various embodiments, such information may include DCI transmitted on a physical uplink control channel (PUCCH). After receiving one or more RS configurations, the terminal may receive, from the base station, information including the indicator indicating that the RS is transmitted in the time interval and the index indicating the RS configuration including the determined RS density, and may receive the second RSs of the RS density from the base station based on the information received at step 405. More specifically, the terminal may identify whether the RS is transmitted at the RS density and in the time interval, based on the information received from the base station, and if the RS is transmitted in the time interval, the terminal may receive the second RSs of the identified RS density from the base station. The second RSs may be transmitted, from the base station, not only to the terminal but also to one or more other terminals in the cell of the base station.

The input to the learning algorithm may further include feature information of the terminal. Before determining at step 401 whether the channel forecast value is valid, the terminal may transmit the feature information of the terminal to at least one of the base station or another terminal, and may receive weights of the learning algorithm corresponding to feature information of another terminal, which is similar to the feature information of the terminal, from at least one of the base station or the another terminal. If the feature information of the terminal and the feature information of another terminal are similar, a feature difference between the feature information of the terminal and the feature information of the another terminal may be within the threshold range. The feature difference may include a difference between attributes included in the feature information. The feature difference may include at least one of a difference between a position of the terminal and a position of the another terminal, a difference between a moving speed of the terminal and a moving speed of the another terminal, or a difference between a trajectory that the terminal has moved over time and a trajectory that the another terminal has moved over time. A learning algorithm corresponding to feature information may refer to a learning algorithm, an input to which includes the feature information. The learning algorithm corresponding to the feature information of the terminal may be a learning algorithm of the terminal. If the terminal receives weights of the learning algorithm corresponding to the feature information of the terminal, the terminal may acquire a channel forecast value by applying the received weights to an input including the feature information of the terminal and/or channel estimation values.

The terminal may periodically determine whether the channel forecast value is valid according to the RS transmission period in which the first RSs are transmitted.

The terminal may not verify whether the learning algorithm is valid during a channel forecast time (CFT), and may acquire the channel forecast information based on the learning algorithm. If the terminal determines that the learning algorithm is valid, the terminal may not further verify whether the learning algorithm is valid during the CFT, and may perform channel forecasting based on the learning algorithm. Therefore, since the terminal does not transmit the RS request message during the CFT, feedback overhead may be reduced, and it may be guaranteed to perform channel forecasting during the CFT.

The channel forecast information may be transmitted to the base station in a time interval determined according to a reporting period of channel forecasting. If the reporting period of channel forecasting is 3 ms, the terminal may transmit the channel forecast information to the base station in a time interval 3 ms after a time interval in which previous channel forecasting information has been transmitted. The channel forecast information may be transmitted to the base station aperiodically in response to a determination that the channel forecast information is different from the previous channel forecast information. If the terminal determines that the channel forecast information is different from the previously reported channel forecast information by the threshold range, the terminal may transmit the channel forecast information to the base station in response to the determination. "Previous channel forecast information" may include most recently reported channel forecast information and/or channel forecast information reported before thereof, in the channel forecast information which has already been reported to the base station.

Figure 5:
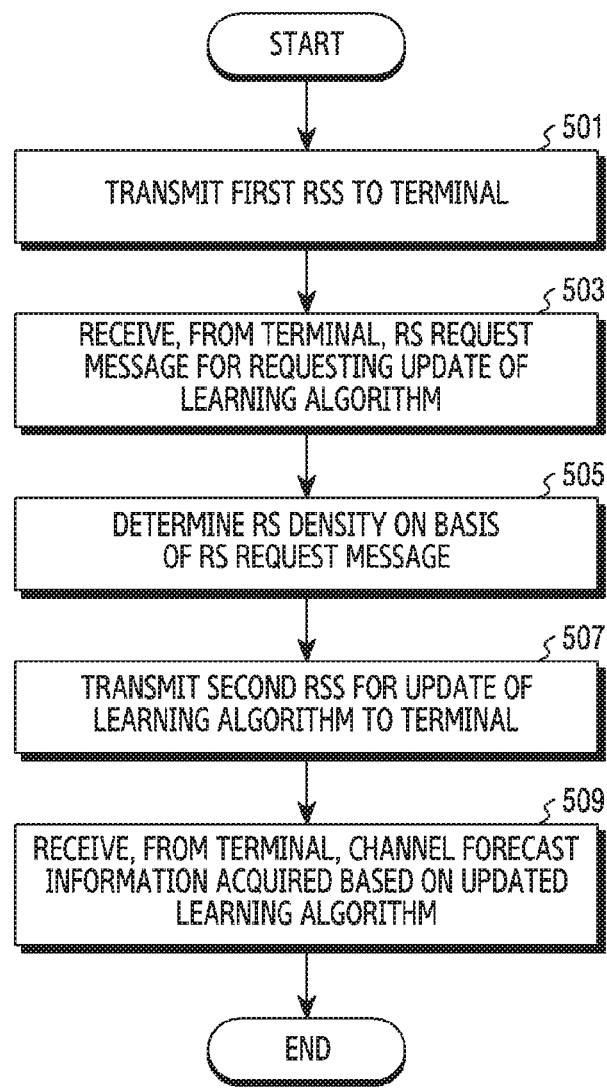
FIG. 5 illustrates a flowchart of the base station in the wireless communication system, according to an embodiment.

FIG. 5 illustrates a flowchart of the base station in the wireless communication system, according to an embodiment. FIG. 5 illustrates an operation method of the base station 110.

Referring to FIG. 5, at step 501, the base station may transmit first RSs to a terminal. The base station may transmit CRSs or CSI-RSs to the terminal.

At step 503, the base station may receive, from the terminal, an RS request message for requesting an update of a learning algorithm. If a channel forecast value, which is acquired by applying the learning algorithm to an input including channel values estimated based on the first RSs, is invalid, the base station may receive, from the terminal, the RS request message for requesting the update of the learning algorithm.

At step 505, the base station may determine an RS density based on the RS request message. The base station may determine an RS transmission period based on the RS request message.

At step 507, the base station may transmit, to the terminal, second RSs for updating the learning algorithm. Here, an RS density of the second RSs may be the RS density determined at step 505. The base station may transmit the second RSs to the terminal in the determined RS transmission period in response to the RS request message.

At step 509, the base station may receive, from the terminal, channel forecast information acquired based on the updated learning algorithm. More specifically, the channel forecast value may be acquired by applying the updated learning algorithm to the input including channel values estimated based on the second RSs, and the channel forecast information may be acquired and/or derived from the channel forecast value.

The RS request message received at step 503 may include an RSDI. In other words, the base station may receive the RSDI from the terminal at step 503. In this case, the base station may determine a required RS density and an RS transmission period based on the RSDI. The required RS density may be an RS density indicated by the RSDI. The RS transmission period may be inversely proportional to the RS density indicated by RSDI. If the RS density indicated by the RSDI is high, the RS transmission period may be relatively short, if the RS density indicated by the RSDI is low, the RS transmission period may be relatively long. The base station may transmit, at step 507, the second RSs of the required RS density to the terminal in the RS transmission period. The required RS density may be determined by the terminal, and the required RS density may be determined based on a difference (or a learning level of the terminal) between the channel forecast value and the channel value estimated in a time interval related to the channel forecast value.

The RS request message received at step 503 may include an RSR. In other words, the base station may receive the RSR from the terminal at step 503. In this case, the base station may identify, at step 505, a preconfigured RS density and a preconfigured RS transmission period which correspond to the RSR or n that is the number of times the RSR has been transmitted. If n is relatively large, the preconfigured RS density may be relatively high, and the preconfigured RS transmission period may be relatively short. If n is relatively small, the preconfigured RS density may be relatively low, and the preconfigured RS transmission period may be relatively long. At step 507, the base station may transmit the second RSs of the identified preconfigured RS density to the terminal in the identified preconfigured RS transmission period.

The RS request message may include at least one of the RSDI or the RSR. If the RS density indicated by the RSDI is greater than or equal to a threshold density, or the number of times the RSR has been transmitted is greater than or equal to a threshold value, the base station may transmit, to the terminal, a stop flag for requesting at least one of stopping the update of the learning algorithm or stopping of channel forecasting. If the terminal receives the stop flag, the terminal may not update the learning algorithm or may not perform channel forecasting.

In addition to receiving the RS request message from the terminal, the base station may receive RS request messages from one or more other terminals in a cell of the base station. The base station may determine the RS density and the RS transmission period based on the received RS request messages. If the base station receives RSDIs from the terminals in the cell of the base station, the base station may determine a highest value, a lowest value, an average value, a median value, or a mode value among RS densities indicated by the RSDIs, as a representative value, may determine the representative value as the RS density for transmission of the second RSs, and may determine the RS transmission period based on the representative value. The representative value and the RS transmission period may be inversely proportional. If the base station receives RSRs from the terminals in the cell of the base station, the base station may determine a highest value, a lowest value, an average value, a median value, or a mode value in the number of times the RSRs are transmitted from the respective terminals, as a representative value, and may determine a predetermined RS density and a predetermined RS transmission period which correspond to the representative value. The base station may transmit one or more RS configurations to the terminals in the cell via RRC signaling (or higher layer signaling), and then may transmit the determined RS transmission period and an index indicating the RS configuration including the determined RS density. If the RS transmission period is included in the RS configuration, the base station may transmit the index indicating the RS configuration to the terminals in the cell, and may not transmit the RS transmission period to the terminals in the cell. At step 507, the base station may transmit the second RSs of the RS density indicated via the terminal to the terminals in the cell of the base station in the RS transmission period indicated via the terminal.

In addition to receiving the RS request message from the terminal, the base station may receive RS request messages from one or more other terminals in the cell of the base station. The base station may determine the RS density based on the received RS request messages. If the base station receives RSDIs from the terminals in the cell of the base station, the base station may determine a highest value, a lowest value, an average value, a median value, or a mode value among RS densities indicated by the RSDIs, as a representative value, and may determine the representative value as the RS density for transmission of the second RSs. If the base station receives RSRs from the terminals in the cell of the base station, the base station may determine a highest value, a lowest value, an average value, a median value, or a mode value in the number of times the RSRs are transmitted from the respective terminals, as a representative value, and may determine a predetermined RS density corresponding to the representative value. The base station may transmit one or more RS configurations to the terminals in the cell via RRC signaling (or higher layer signaling), and then may transmit, to the terminals in the cell, information including an indicator indicating that the RS is transmitted in the time interval and an index indicating the RS configuration including the determined RS density. Such information may include DCI transmitted on a PUCCH. At step 507, the base station may transmit, to the terminals in the cell, the second RSs of the RS density indicated via the terminals in the cell in the corresponding time interval.

The input for the learning algorithm may further include feature information of the terminal. The base station may receive the feature information of the terminal from the terminal, and may transmit, to the terminal, weights of the learning algorithm corresponding to feature information of another terminal, which is similar to the feature information of the terminal. If the terminal receives weights of the learning algorithm corresponding to the feature information of the terminal, the terminal may acquire a channel forecast value by applying the received weights to an input including the feature information of the terminal and/or channel estimation values.

The channel forecast information may be received from the terminal in a time interval determined according to a reporting period of channel forecasting, or may be aperiodically received from the terminal if the channel forecast information is different from previous channel forecast information.

More specifically, various embodiments may include i) a method for configuring input and output of a learning algorithm, ii) a method for updating the learning algorithm for channel forecasting, iii) a method for sharing weights of the learning algorithm between terminals (learning support), and iv) a method for performing link adaptation using a result of channel forecasting.

Figure 6:
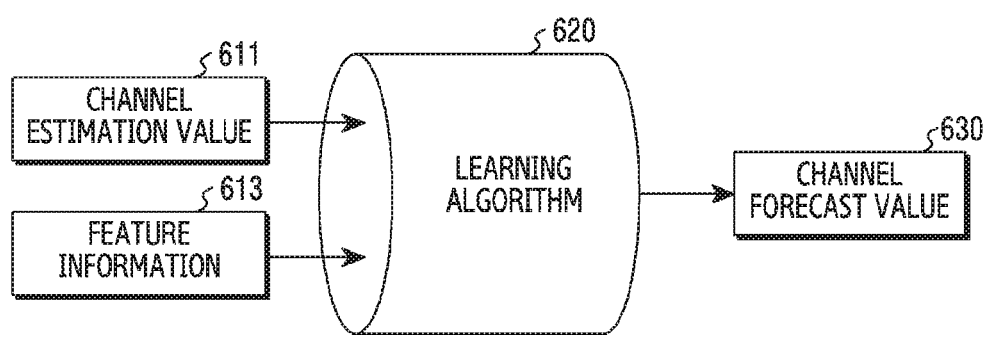
FIG. 6 illustrates an input and an output of a learning algorithm in the wireless communication system, according to an embodiment.

FIG. 6 illustrates an input and an output of a learning algorithm in the wireless communication system, according to an embodiment.

Referring to FIG. 6, an input of a learning algorithm (e.g., DNN) 620 of a terminal may include a channel estimation value 611 and/or feature information 613 of the terminal. The channel estimation value 611 is required to model a channel change tendency varying continuously over time, and may be thus used as an input to a learning algorithm 620. By using the feature information 613 of the terminal as the input to the learning algorithm 620, even if the feature information 613 of the terminal is changed, the terminal may design the learning algorithm 620 reflecting the changed feature information 613. Designing of the learning algorithm may refer to determining a valid learning algorithm and/or weights of the valid learning algorithm according to iterative updating of the learning algorithm or verification of the learning algorithm. Particularly, since the feature information 613 of the terminal is reflected in the learning algorithm 620, the weights of the learning algorithm 620 and/or the learning algorithm 620 are shared with another terminal having similar feature information, or a learning algorithm of the another terminal may be shared with the terminal. By using the learning algorithm and/or weights of the learning algorithm shared by the another terminal, the terminal may determine, more quickly and accurately, the learning algorithm 620 suitable for channel forecasting. The output of the learning algorithm 620 may include a channel forecast value 630.

Figure 7:
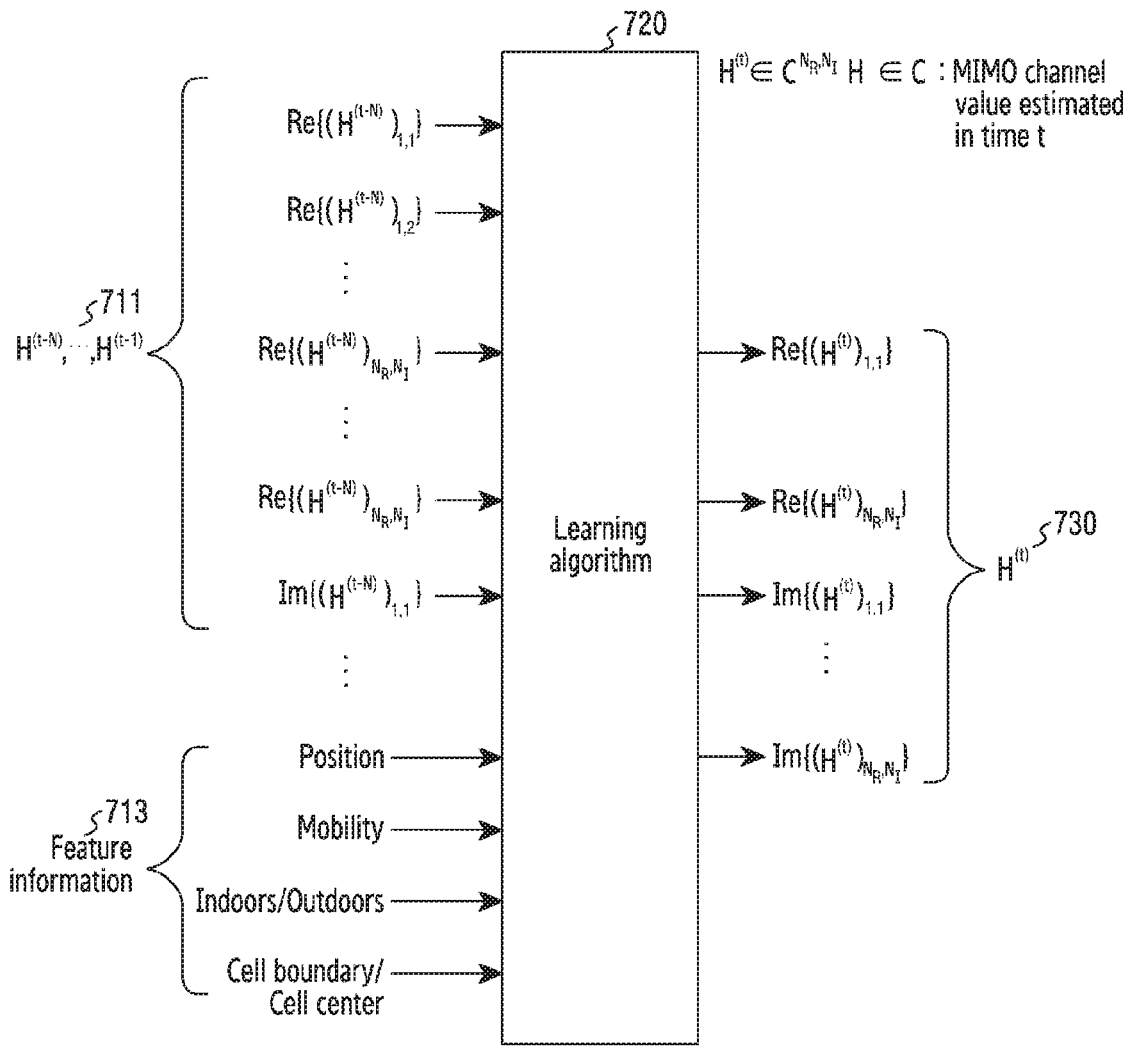
FIG. 7 illustrates an input and an output of the learning algorithm in the wireless communication system, according to an embodiment.

FIG. 7 illustrates an input and an output of the learning algorithm in the wireless communication system, according to an embodiment.

Referring to FIG. 7, an input to a learning algorithm 720 may include channel estimation values 711 and/or feature information 713 of a terminal. The channel estimation values 711 may include channel estimation values $H^{(t-N)}$ to $H^{(t-1)}$ for time intervals (t−N) to (t−1) (i.e., channel estimation value $H^{(t-N)}$ for time interval (t−N), channel estimation value $H^{(t-N+1)}$ for time interval (t−N+1), . . . , channel estimation value $H^{(t-1)}$ for time interval (t−1)). An output of the learning algorithm 720 may include a channel forecast value 730. The channel forecast value 730 may include channel forecast value $H^{(t)}$ for time interval t.

A real number part and an imaginary number part of channel matrix elements may be separated in the input and output of the learning algorithm 720, and the real number part and the imaginary number part may be vectorized and processed.

Since the size of channel values in the input and output of the learning algorithm 720 may vary according to feature information of the terminal (e.g., the position and/or mobility of the terminal), in order to improve the accuracy and learning speed of (i.e., the speed of designing the learning algorithm 720) the learning algorithm 720 and to make the influence of different types of input values of the learning algorithm 720 fairly uniform, the size of the channel values may be normalized.

Continuous values, such as the position and/or mobility of the terminal in the feature information 713, may be normalized and expressed as values of one or more dimensions. The position and/or mobility of the terminal may be represented by a three-dimensional vector. In the feature information 713, discrete values, such as whether the terminal is positioned indoors or outdoors, or whether the terminal is positioned at a cell center or a cell boundary, may be expressed as a multi-dimensional one-hot vector.

Referring to FIG. 7, the terminal may acquire channel forecast value $H^{(t)}$ for time interval t, by applying the learning algorithm 720 to the input including channel forecast values $H^{(t-N)}$ to $H^{(t-1)}$ for time intervals (t−N) to (t−1). The terminal may acquire channel forecast value $H^{(t+1)}$ for time interval (t+1) by applying the learning algorithm 720 to the input including channel forecast value $H^{(t)}$ for time t and channel forecast values $H^{(t-N+1)}$ to $H^{(t-1)}$ for time intervals (t−N+1) to (t−1). As described above, the terminal may repeatedly use the acquired channel forecast value as the input of the learning algorithm 720, and therefore the terminal may forecast a channel value for a future time interval until the terminal receives an RS in the future time interval and estimates the channel value for the future time interval.

A result of channel forecasting based on the learning algorithm 720 may be expressed as shown in Table 1 below:

TABLE 1

| | |
|---|---|
| normalized mean square error (MSE) | 0.00715 |
| probability of false alarm in CQI index | 0.0192 |

The results of channel forecasting expressed in Table 1 are exemplary, and various channel forecasting results may be acquired.

The learning algorithm 720 may be determined according to a design parameter. Once the learning algorithm 720 is determined according to the design parameter, the learning algorithm 720 may be updated based on the input and output of the learning algorithm 720 until the learning algorithm 720 becomes valid.

Design parameters for the learning algorithm 720 may be expressed as Table 2 below:

TABLE 2

| | |
|---|---|
| Learning rate | 1e−6 |
| hidden layer dimension | 2048 × 2048 × 2048 |
| batch size | 200 |
| activation function | Tanh |
| Optimizer | Adam |
| number of channels for learning | 40000 transmission time interval (TTI) |
| {BS, UE} number of antennas | {8, 2} |
| LTE scenario | 3D-UMi |
| effective SINR mapping | MIESM |

Types and values of the design parameters expressed in Table 2 are exemplary, and various design parameters may be applied.

In Table 1 and Table 2, it has been assumed that the number N of channel estimation values included in the input of the learning algorithm 720 is 3, and a CSI-RS is 5 ms. However, this is exemplary, and various modifications are possible.

If the terminal enables learning of a learning algorithm by using RSs transmitted in a relatively long RS transmission period of 5 ms or more, forecasting accuracy of a channel value forecasted based on the learning algorithm may be reduced. Accurate learning may be required for channel forecasting using the learning algorithm, and thus a learning phase in which an RS is continuously transmitted may be required. Methods for updating the learning algorithm for channel forecasting may include those described below.

Terminal-specific learning (or user-specific learning) may refer to a technique for enabling learning of a learning algorithm of a specific terminal based on RSs transmitted at periods and/or an RS density applicable to the specific terminal. The terminal-specific learning method is a learning method initiated by the terminal, and according to the terminal-specific learning method, the base station may selectively transmit an additional RS to a terminal having requested a learning phase from among terminals in an RRC connection state, and may support the terminal to update the learning algorithm of the terminal. Each terminal may determine whether the learning algorithm is valid, and may request a learning phase from the base station if the learning algorithm is invalid. Since the length of the required learning phase and/or the number of RSs required to design the learning algorithm may be different depending on the terminal, the terminal-specific learning method may ensure a specific learning phase for each terminal. An RS for terminal-specific learning may include an RS (e.g., a CSI-RS and a CRS) used to calculate CSI.

The terminal may transmit an RS request message to the base station to request a learning phase for terminal-specific learning. The RS request message may include at least one of an RSDI or an RSR. Depending on whether a type of the RS request message is the RSDI or the RSR, a transmission signal of the terminal, a method for scheduling a downlink subframe by the base station, and/or a criterion for determining an unsuitable terminal for performing channel forecasting may be distinguished.

The terminal may determine a required RS density based on a learning degree of a learning algorithm of the terminal, and may transmit an RSDI to the base station to request the determined RS density. The terminal may determine the required RS density to be relatively high if the learning degree is low, and may determine the required RS density to be relatively low if the learning degree is high. The RSDI may be transmitted from the terminal to the base station via a PUCCH. The base station may determine an RS density and/or an RS transmission period based on the RSDI received from the terminal, and may transmit RSs of the determined RS density to the terminal in the determined RS transmission period. The base station may determine the RS density for transmission of an RS to be equal to the RS density indicated by the RSDI, and the base station may determine the RS transmission period to be relatively short if the RS density indicated by the RSDI is high, and may determine the RS transmission period to be relative long if the RS density is low. Further, the base station may determine learning degrees of the terminals based on RSDIs received from the terminals in the coverage of the base station (or in the cell of the base station). If a representative value of the RS densities indicated by the RSDIs received from the terminals is high, the base station may determine that the learning degrees of the terminals are low. Alternatively, if the representative value of the RS densities indicated by the RSDIs received from the terminals is low, the base station may determine that the learning degrees of the terminals are high. The base station may perform scheduling of a downlink subframe for terminal-specific learning, in consideration of the learning degrees of the terminals in the coverage.

The terminal may transmit, to the base station, an RSR indicating that a learning algorithm needs to be updated. For example, the RSR may be a 1-bit signal and may be transmitted from the terminal to the base station via a PUCCH. If the RSR is transmitted, feedback overhead may be reduced compared to when an RSDI is transmitted. A preconfigured RS density and a preconfigured RS transmission period corresponding to the RSR may exist, and multiple preconfigured RS densities and multiple preconfigured RS transmission periods may exist according to the number of times the RSR has been transmitted from the terminal. If the number of times the RSR is transmitted from the terminal is n (n=1, 2, . . . , $N_{Max}$), a preconfigured RS density and a preconfigured RS transmission period corresponding to each n may exist. Here, $N_{Max}$ refers to a maximum value of the number of RSR transmissions in which the preconfigured RS density and the preconfigured RS transmission period may be defined. The base station may identify a preconfigured RS density and a preconfigured RS transmission period which correspond to the RSR or n that is the number of times the RSR has been transmitted. If n is relatively large, the preconfigured RS density may be relatively high, and the preconfigured RS transmission period may be relatively short. If n is relatively small, the preconfigured RS density may be relatively small, and the preconfigured RS transmission period may be relatively long. Further, the base station may determine learning degrees of the terminals based on RSRs received from the terminals in the coverage of the base station (or in the cell of the base station). If a representative value of the number of transmission times of the RSRs received from the terminals is high, the base station may determine that the learning degrees of the terminals are low. Alternatively, if the representative value of the number of transmission times of the RSRs received from the terminals is small, the base station may determine that the learning degrees of the terminals are high. The base station may transmit RSs of the identified preconfigured RS density to the terminal in the identified preconfigured RS transmission period.

Figure 8:
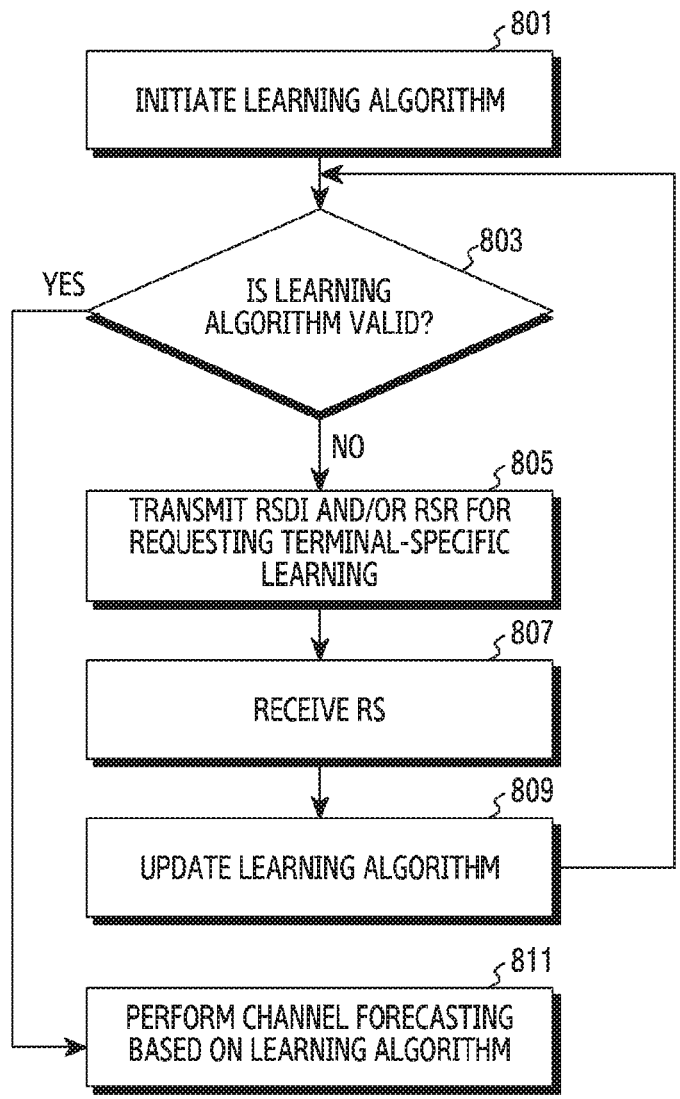
FIG. 8 illustrates a flowchart of the terminal for terminal-specific learning in the wireless communication system, according to an embodiment.

FIG. 8 illustrates a flowchart of the terminal for terminal-specific learning in the wireless communication system, according to an embodiment. FIG. 8 illustrates an operation method of the terminal 120.

Referring to FIG. 8, at step 801, the terminal may initiate a learning algorithm. Initiation of the learning algorithm may refer to determining initial weights of the learning algorithm. The terminal may determine, as initial weights, weights of a learning algorithm of another terminal, which are received from another terminal or a base station, or may determine, as initial weights, weights randomly generated by the terminal.

At step 803, the terminal may determine whether the learning algorithm is valid. If a difference between a channel forecast value acquired based on the learning algorithm and a channel value estimated in a time interval related to the channel forecast value falls within a threshold range, the terminal may determine that the learning algorithm is valid. Alternatively, if the difference between the channel forecast value acquired based on the learning algorithm and the channel value estimated in the time interval related to the channel forecast value is out of the threshold range, the terminal may determine that the learning algorithm is invalid.

If the learning algorithm is invalid, at step 805, the terminal may transmit, to the base station, an RSID and/or an RSR for requesting terminal-specific learning. The RSDI may indicate an RS density required for updating the learning algorithm, and the RSR may indicate that the learning algorithm is required to be updated.

At step 807, the terminal may receive RSs from the base station. An RS density and/or an RS transmission period may be determined based on the RSDI and/or the RSR, and the terminal may receive RSs of the RS density from the base station in the RS transmission period.

At step 809, the terminal may update the learning algorithm. The terminal may estimate channel values based on the RSs received from the base station, and may update the learning algorithm based on the estimated channel values. Thereafter, the terminal may return to step 803, and may determine whether the updated learning algorithm is valid.

On the other hand, if the learning algorithm is valid at step 803, the terminal may perform channel forecasting based on the learning algorithm at step 811. The terminal may receive RSs from the base station, may estimate channel values based on the RSs, may acquire a channel forecast value by applying the learning algorithm to an input including the estimated channel values, may acquire or derive channel forecast information from the acquired channel forecast value, and may transmit the channel forecast information to the base station.

Figure 9:
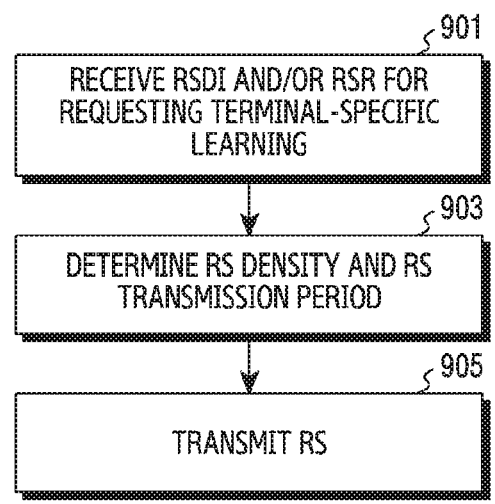
FIG. 9 illustrates a flowchart of the base station for terminal-specific learning in the wireless communication system, according to an embodiment.

FIG. 9 illustrates a flowchart of the base station for terminal-specific learning in the wireless communication system, according to an embodiment. FIG. 9 illustrates an operation method of the base station 110.

Referring to FIG. 9, at step 901, the base station may receive, from a terminal, an RSID and/or an RSR for requesting terminal-specific learning. The base station may receive the RSDI and/or the RSR for requesting a learning phase for terminal-specific learning, from the terminal via a PUCCH.

At step 903, the base station may determine an RS density and an RS transmission period. The base station may determine the RS density and/or the RS transmission period based on the RSDI. The base station may determine the RS density and/or the RS transmission period based on the RSR and/or the number of times the RSR is transmitted. The base station may transmit information (e.g., DCI) including the determined RS density and RS transmission period to the terminal via the PDCCH.

At step 905, the base station may transmit RSs to the terminal. The base station may transmit RSs of the RS density to the terminal in the RS transmission period.

Figure 10:
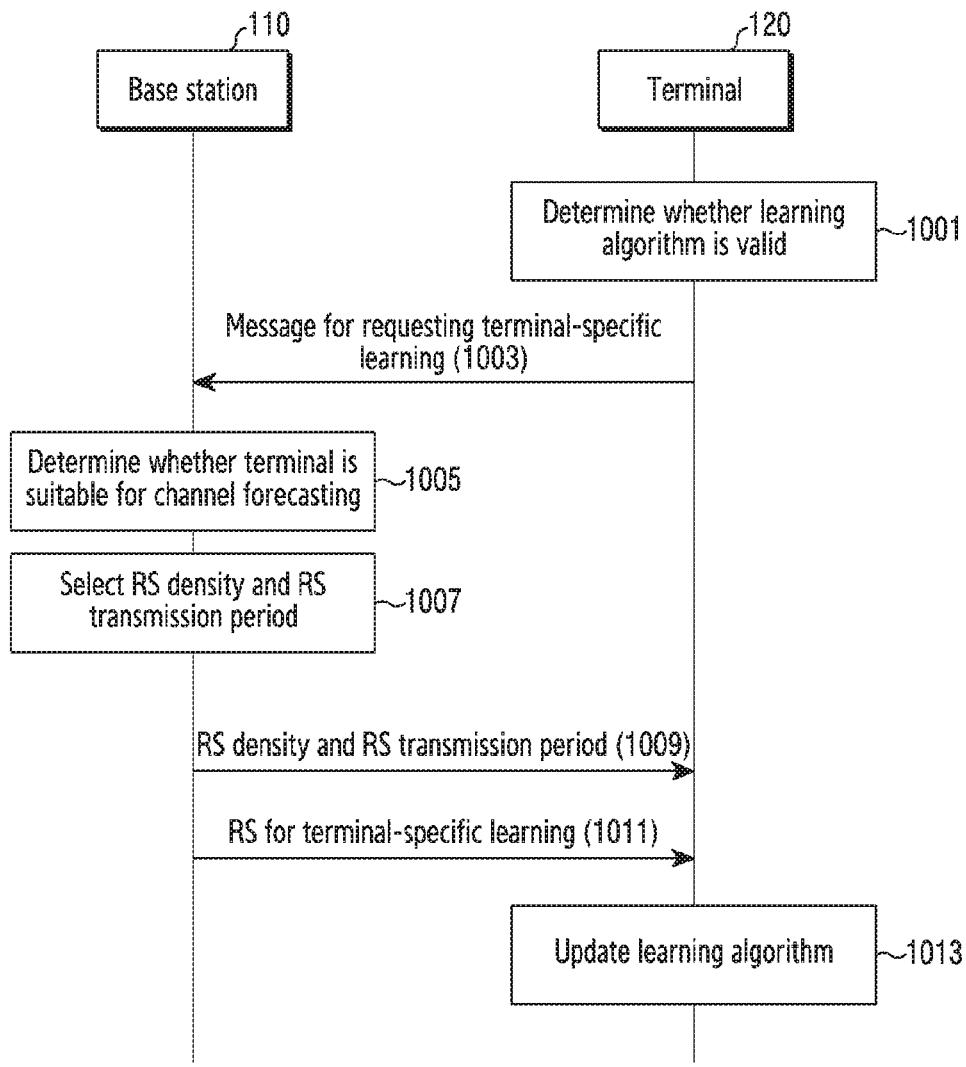
FIG. 10 illustrates a signal flowchart between the base station and the terminal for terminal-specific learning in the wireless communication system, according to an embodiment.

FIG. 10 illustrates a signal flowchart between the base station and the terminal for terminal-specific learning in the wireless communication system, according to an embodiment.

Referring to FIG. 10, at step 1001, the terminal 120 determines whether a learning algorithm is valid. If a difference between a channel forecast value acquired based on the learning algorithm and a channel value estimated in a time interval related to the channel forecast value falls within a threshold range, the terminal 120 may determine that the learning algorithm is valid. Alternatively, if the difference between the channel forecast value acquired based on the learning algorithm and the channel value estimated in the time interval related to the channel forecast value is out of the threshold range, the terminal 120 may determine that the learning algorithm is invalid.

If the learning algorithm is invalid, the terminal 120 transmits, to the base station 110, a message for requesting terminal-specific learning, at step 1003. The message at step 1003 may be an RS request message, and may include at least one of an RSDI or an RSR. The RS request message may be transmitted via a PUCCH.

At step 1005, the base station 110 may determine whether the terminal 120 is suitable for channel forecasting. In other words, the base station 110 may determine whether the terminal 120 is capable of performing channel forecasting. If an RS density indicated by the RSDI is greater than or equal to a threshold RS density, or the number of times the RSR is transmitted is greater than or equal to a threshold value, the base station 110 may determine that the terminal 120 is not suitable for channel forecasting. Alternatively, if the RS density indicated by the RSDI is less than the threshold RS density, or the number of times the RSR is transmitted is less than the threshold value, the base station 110 may determine that the terminal 120 is suitable for channel forecasting.

If the terminal 120 is suitable for channel forecasting, the base station 110 may select, at step 1007, the RS density and the RS transmission period. The base station 110 may determine the RS density and/or the RS transmission period based on the RSDI. The base station 110 may determine the RS density and/or the RS transmission period based on the RSR and/or the number of times the RSR is transmitted.

At step 1009, the base station 110 may transmit information including the RS density and the RS transmission period to the terminal 120. The base station 110 may transmit DCI including the RS density and the RS transmission period to the terminal 120 via the PDCCH.

At step 1011, the base station 110 may transmit RSs for terminal-specific learning to the terminal 120. The base station 110 may transmit RSs of the RS density to the terminal 120 in the RS transmission period.

At step 1013, the terminal 120 may update the learning algorithm. The terminal 120 may estimate channel values based on the RSs received from the base station 110, and may update the learning algorithm based on the estimated channel values.

If the mobility of the terminal is high (i.e., a moving speed of the terminal is fast) or a channel between the terminal and the base station changes rapidly, the terminal may not be suitable for channel forecasting. The base station may transmit a stop flag to a terminal that is not suitable for channel forecasting, so as to prevent the terminal from learning the learning algorithm and/or prevent the terminal from performing channel forecasting. As described above, an example of stopping channel forecasting by using a stop flag is described in FIG. 11.

Figure 11:
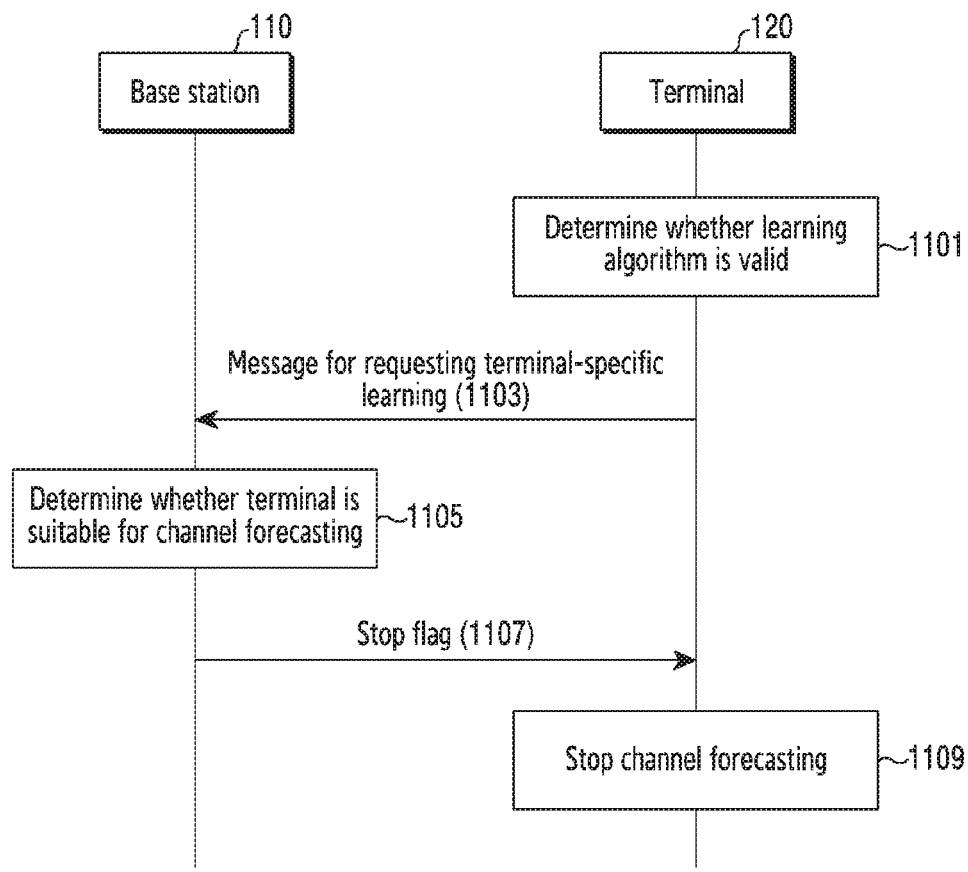
FIG. 11 illustrates a signal flowchart between the base station and the terminal for stopping channel forecasting in the wireless communication system, according to an embodiment.

FIG. 11 illustrates a signal flowchart between the base station and the terminal for stopping channel forecasting in the wireless communication system, according to an embodiment.

Referring to FIG. 11, at step 1101, the terminal 120 determines whether a learning algorithm is valid. If a difference between a channel forecast value acquired based on the learning algorithm and a channel value estimated in a time interval related to the channel forecast value falls within a threshold range, the terminal 120 may determine that the learning algorithm is valid. Alternatively, if the difference between the channel forecast value acquired based on the learning algorithm and the channel value estimated in the time interval related to the channel forecast value is out of the threshold range, the terminal 120 may determine that the learning algorithm is invalid.

If the learning algorithm is invalid, the terminal 120 transmits, to the base station 110, a message for requesting terminal-specific learning, at step 1103. The message at step 1103 may be an RS request message, and may include at least one of an RSDI or an RSR. The RS request message may be transmitted via a PUCCH.

At step 1105, the base station 110 may determine whether the terminal 120 is suitable for channel forecasting. In other words, the base station 110 may determine whether the terminal 120 is capable of performing channel forecasting. If an RS density indicated by the RSDI is greater than or equal to a threshold RS density, or the number of times the RSR is transmitted is greater than or equal to a threshold value, the base station 110 may determine that the terminal 120 is not suitable for channel forecasting. The threshold RS density may be referred to as a maximum RS density, and the threshold value may be also referred to as a maximum RSR. If a cumulative sum of RS densities indicated by repeatedly transmitted RSDIs is greater than or equal to the threshold RS density, the base station 110 may determine that the terminal 120 is not suitable for channel forecasting. Alternatively, if the RS density indicated by the RSDI is less than the threshold RS density, or the number of times the RSR is transmitted is less than the threshold value, the base station 110 may determine that the terminal 120 is suitable for channel forecasting.

If the terminal 120 is not suitable for channel forecasting, the base station 110 may transmit a stop flag to the terminal 120 at step 1107. The base station 110 may transmit the stop flag to the terminal 120 via a PDCCH.

At step 1109, the terminal 120 may stop channel forecasting. If the terminal 120 receives the stop flag, the terminal 120 may not update the learning algorithm or may not perform channel forecasting.

Cell-specific learning refers to a technique for enabling learning of learning algorithms of all terminals in a cell based on periodically transmitted RSs and/or RS densities applicable to all the terminals in the cell of a base station. Cell-specific is a learning method initiated by the base station, and according to the cell-specific learning method, the base station may transmit an RS to a terminal to allow the terminal to update a learning algorithm of the terminal, regardless of whether the terminal is in an RRC connection state (i.e., regardless of a connection state of the terminal). In the cell-specific learning method, the base station may provide learning data for a learning phase to all the terminals in the cell of the base station, and therefore according to the cell-specific learning method, feedback overhead for requesting the learning phase by individual terminals may be decreased. Further, even if the terminal has already designed a learning algorithm having high forecast accuracy via cell-specific learning, the base station may continuously provide the learning data for the learning phase to the terminals in the cell according to cell-specific learning, so that the terminal may continuously update the learning algorithm according to a change in a channel environment. The "forecast accuracy of the learning algorithm" may be related to a difference between a channel forecast value acquired based on the learning algorithm and a channel estimation value for a time interval related to the channel forecast value. If the difference between the channel forecast value acquired based on the learning algorithm and the channel estimation value for the time interval related to the channel forecast value falls within a threshold range, and the difference is relatively small, the forecast accuracy of the learning algorithm may be high. Alternatively, if the difference between the channel forecast value acquired based on the learning algorithm and the channel estimation value for the time interval related to the channel forecast value is out of the threshold range, or the difference is relatively large, the forecast accuracy of the learning algorithm may be low. The base station may determine learning degrees of the terminals in the cell based on RSDIs and/or RSRs received from the terminals in the cell, and may determine an RS density and/or an RS transmission period based on the learning degree. If the learning degrees of the terminals in the cell are low, the base station may determine the RS density to be high and the RS transmission period to be short. Alternatively, if the learning degrees of the terminals in the cell are high, the base station may determine the RS density to be low and the RS transmission period to be long. If cell-specific learning and terminal-specific learning are used together, effective scheduling of a downlink subframe may be possible. The RS for cell-specific learning may include a new type of RS as well as CSI-RS and CRS, for CSI calculation. The base station may preferentially assign the RS for cell-specific learning to the RS for terminal-specific learning, and cell-specific learning may include the following two methods according to a learning phase:

A periodic cell-specific learning method may include a method for periodically transmitting RSs for a learning phase of cell-specific learning by a base station. According to periodic cell-specific learning, the base station may transmit an index indicating an RS configuration and/or an RS transmission period to terminals in a cell via a system information block (SIB), and may periodically transmit the RSs for the learning phase to the terminals in the cell according to the RS configuration and/or the RS transmission period. According to the periodic cell-specific learning, the base station may transmit RS configurations and/or RS transmission periods to the terminals in the cell via the SIB or upper layer signaling, and may transmit information including an index indicating the RS configurations including a RS density determined based on learning degrees of the terminals in the cell and an indicator indicating the RS transmission periods determined based on the learning degrees, to the terminals in the cell via a PDCCH, MAC CE signaling, or upper layer signaling. In this case, the base station may periodically transmit RSs for the learning phase to the terminals in the cell according to the RS transmission period and/or the RS configuration indicated by the indicator and/or the index. The terminals may receive the RSs from the base station based on the RS transmission period and/or the RS configuration indicated by the base station, and may update the learning algorithm based on the received RSs.

A dynamic cell-specific learning method may include a method for aperiodically and dynamically transmitting RSs for a learning phase of cell-specific learning by a base station. The base station may transmit information including an indicator that indicates whether an RS is transmitted in a certain time interval and an index that indicates an RS configuration, to terminals in the corresponding time interval via a PDCCH, MAC CE signaling or RRC signaling. The terminal receives such information in a corresponding time interval and identifies whether an RS is transmitted in the time interval, and if the RS is transmitted in the time interval, the terminal may receive RSs of an RS density indicated by an RS configuration to the base station in the time interval, and may update a learning algorithm based on the received RSs.

Figure 12:
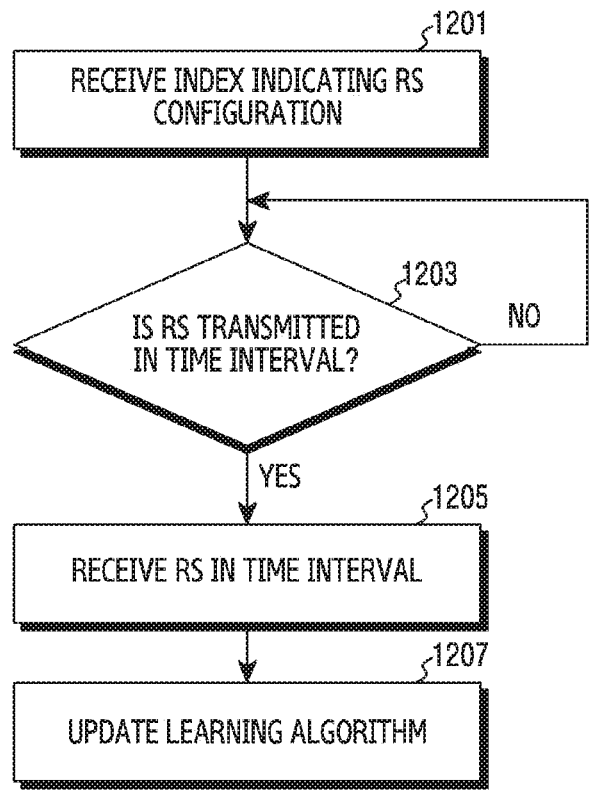
FIG. 12 illustrates a flowchart of the terminal for cell-specific learning in the wireless communication system, according to an embodiment.

FIG. 12 illustrates a flowchart of the terminal for cell-specific learning in the wireless communication system, according to an embodiment. FIG. 12 illustrates an operation method of the terminal 120.

Referring to FIG. 12, at step 1201, the terminal may receive an index indicating an RS configuration. The RS configuration indicated by the index may include an RS transmission period, or if the RS transmission period is received separately from the RS configuration, the terminal may identify that periodic cell-specific learning is performed. If the RS configuration indicated by the index includes an indicator that indicates whether an RS is transmitted in a time interval in which the index is received, or if such an indicator is received separately from the RS configuration, the terminal may identify that dynamic cell-specific learning is performed.

At step 1203, the terminal may determine whether the RS is transmitted in the time interval. If periodic cell-specific learning is performed, the terminal may determine whether the RS is transmitted in the current time interval according to the RS transmission period. If dynamic cell-specific learning is performed, the terminal may determine whether the RS is transmitted in the current time interval according to the indicator. If the RS is transmitted in the time interval, the terminal may perform step 1205. Alternatively, if no RS is transmitted in the time interval, the terminal may return to step 1203.

At step 1205, the terminal may receive the RS in the time interval. The terminal may receive RSs from the base station based on the RS transmission period and/or an RS density indicated by the RS configuration.

At step 1207, the terminal may update a learning algorithm. The terminal may estimate channel values based on the RSs received from the base station, and may update the learning algorithm based on the estimated channel values.

Figure 13:
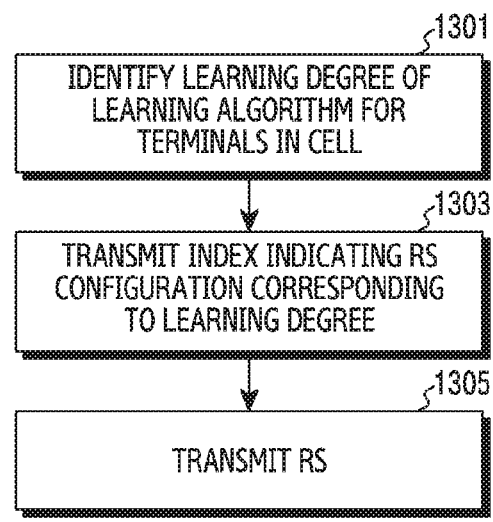
FIG. 13 illustrates a flowchart of the base station for cell-specific learning in the wireless communication system, according to an embodiment.

FIG. 13 illustrates a flowchart of the base station for cell-specific learning in the wireless communication system, according to an embodiment. FIG. 13 illustrates an operation method of the base station 110.

Referring to FIG. 13, at step 1301, the base station may identify learning degrees of learning algorithms for terminals in a cell. For example, the base station may determine the learning degrees of the terminals in the cell based on RSDIs and/or RSRs received from the terminals in the cell.

At step 1303, the base station may transmit an index indicating an RS configuration corresponding to the learning degrees to the terminals in the cell. The base station may determine the RS configuration and/or whether to schedule RSs in a time interval based on the learning degrees of the terminals in the cell. The base station may determine an RS density, an RS transmission period, and/or whether RSs are transmitted in the time interval, based on the learning degrees of the terminals in the cell, and may transmit, to the terminals in the cell, the index indicating the RS configuration including the RS transmission period and/or the RS density, and/or an indicator indicating whether RSs are transmitted in the time interval.

At step 1305, the base station may transmit RSs to the terminals in the cell. The base station may transmit the RSs to the terminals in the cell based on the indicator, the RS transmission period, and/or the index indicated at step 1303.

Figure 14:
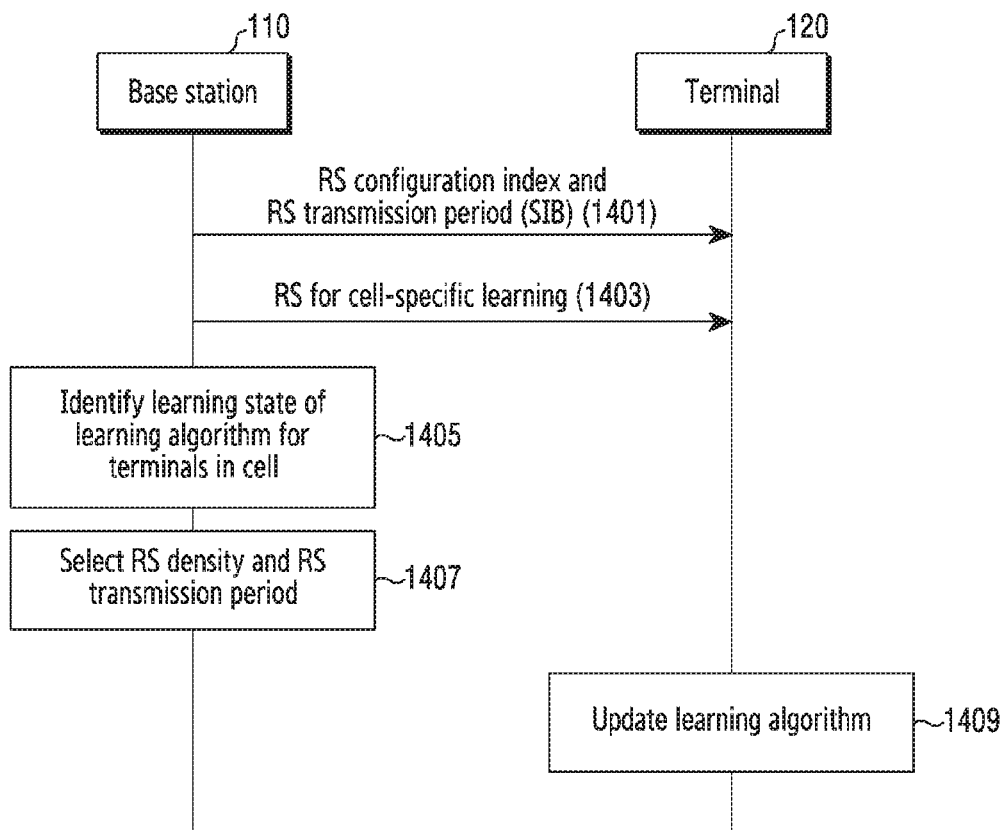
FIG. 14 illustrates a signal flowchart between the base station and the terminal for periodic cell-specific learning in the wireless communication system, according to an embodiment.

FIG. 14 illustrates a signal flowchart between the base station and the terminal for periodic cell-specific learning in the wireless communication system, according to an embodiment.

Referring to FIG. 14, at step 1401, the base station 110 may transmit an RS configuration index and/or an RS transmission period to terminals in a cell, which include the terminal 120, via an SIB. The base station 110 may transmit RS configurations and/or RS transmission periods to the terminals in the cell via higher layer signaling (or RRC signaling), and may transmit RS transmission periods and/or an index indicating RS configurations to the terminals in the cell, which include the terminal 120, via the SIB. The base station 110 may transmit the RS configurations and/or the RS transmission periods to the terminals in the cell via the SIB or higher layer signaling (or RRC signaling), and may transmit the RS transmission periods and/or the index indicating RS configurations to the terminals in the cell, which include the terminal 120, via a PDCCH and MAC CE signaling.

At step 1403, the base station 110 may transmit RSs for terminal-specific learning to the terminals in the cell, which include the terminal 120. The base station 110 may periodically transmit the RSs for cell-specific learning based on the RS transmission periods and RS densities in the RS configurations indicated by the index, to the terminals in the cell, which include the terminal 120.

At step 1405, the base station 110 may identify learning degrees of learning algorithms for the terminals in the cell. The base station 110 may determine learning degrees of the terminals in the cell based on RSDIs and/or RSRs received from the terminals in the cell.

At step 1407, the base station 110 may select an RS density and an RS transmission period. The base station 110 may determine the RS density and/or the RS transmission period based on the learning degrees of the terminals in the cell. The base station 110 may transmit the selected RS transmission period and the index indicating the RS configuration including the selected RS density to the terminals in the cell.

At step 1409, the terminal 120 may update a learning algorithm. The terminal 120 may receive the RSs for cell-specific learning from the base station 110 based on the RS transmission period and the RS density of the RS configuration indicated by the index, may estimate channel values based on the RSs, and may update the learning algorithm based on the estimated channel values.

Figure 15:
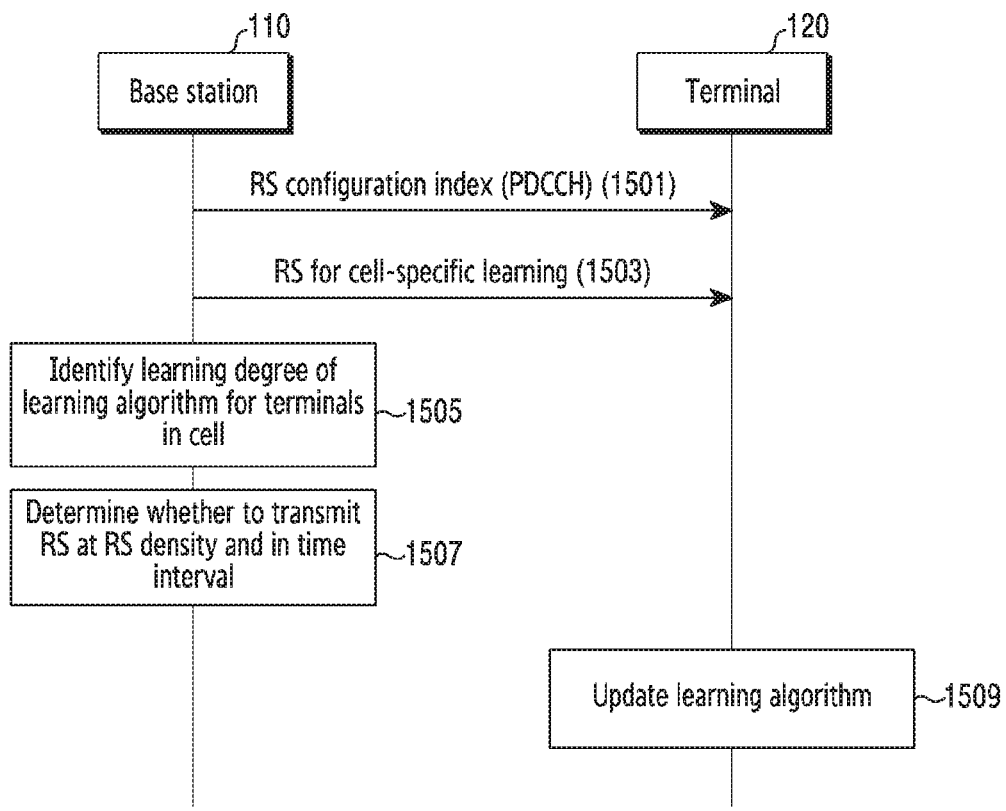
FIG. 15 illustrates a signal flowchart between the base station and the terminal for flexible cell-specific learning in the wireless communication system, according to an embodiment.

FIG. 15 illustrates a signal flowchart between the base station and the terminal for flexible cell-specific learning in the wireless communication system, according to an embodiment.

Referring to FIG. 15, at step 1501, the base station 110 may transmit an RS configuration index to terminals in a cell, which include the terminal 120, via a PDCCH. The base station 110 may transmit RS configurations to the terminals in the cell via an SIB or higher layer signaling, and may transmit an index indicating the RS configurations to the terminals in the cell, which include the terminal 120, via the PDCCH or MAC CE signaling. The base station 110 may transmit the index indicating the RS configuration and an indicator indicating whether an RS is transmitted in a time interval in which the index is transmitted, to the terminals in the cell, which include the terminal 120, via the PDCCH or MAC CE signaling.

At step 1503, the base station 110 may transmit RSs for cell-specific learning to the terminals in the cell, which include the terminal 120. If the base station 110 transmits the indicator indicating that the RS is transmitted in the time interval in which the index is transmitted, to the terminal in the cell in the corresponding time interval, the base station 110 may aperiodically and dynamically transmit the RSs for cell-specific learning to the terminals in the cell based on an RS density in the RS configuration indicated by the index.

On the other hands, if the base station 110 transmits information including an indicator, which indicates that no RS is transmitted in the time interval, to the terminals in the cell in the corresponding time interval, step 1503 may be omitted.

At step 1505, the base station 110 may identify learning degrees of learning algorithms for the terminals in the cell. The base station 110 may determine learning degrees of the terminals in the cell based on RSDIs and/or RSRs received from the terminals in the cell.

At step 1507, the base station 110 may determine an RS density and whether to transmit the RS in the time interval. The base station 110 may determine the RS density and whether to transmit the RS in the time interval, based on the learning degrees of the terminals in the cell. If the base station 110 determines to transmit the RS in the time interval, the base station 110 may transmit information including the indicator indicating that the RS is transmitted in the corresponding time interval and the index that includes the RS configuration including the RS density, to the terminals in the cell in the corresponding time interval. If the base station 110 determines not to transmit the RS in the time interval, the base station 110 may transmit information including the indicator indicating that no RS is transmitted in the corresponding time interval, to the terminals in the cell in the corresponding time interval.

At step 1509, the terminal 120 may update a learning algorithm. If the terminal 120 receives the indicator indicating that the RS is transmitted in the time interval, the terminal 120 may aperiodically and dynamically receive the RSs for cell-specific learning, which are transmitted at the RS density in the RS configuration indicated by the index, from the base station 110 in the corresponding time interval, may estimate channel values based on the RSs, and may update the learning algorithm based on the estimated channel values.

In performing channel forecasting using a learning algorithm, if a distribution of channel estimation values to which the learning algorithm is applied for channel forecasting is different from a distribution of channel estimation values used for designing of the learning algorithm, a terminal needs to update the learning algorithm. However, if the terminal receives shared weights of the learning algorithm, the terminal may update the learning algorithm based on the received weights, thereby quickly designing the learning algorithm having high forecast accuracy. In other words, by sharing the weights of the designed learning algorithm with another terminal having feature information similar to that of the terminal, the another terminal may be enabled to update the learning algorithm more quickly. Depending on whether the base station is involved in learning support, the learning support may include two types of learning support as follows.

A terminal may transmit feature information of the terminal to a base station, and the base station may retrieve a learning algorithm of another terminal, which corresponds to feature information of the another terminal, which is similar to the feature information of the terminal, and may transmit, to the terminal, weights of the retrieved learning algorithm of the another terminal. If the feature information of the terminal is similar to the feature information of the another terminal (e.g., channel distributions and/or characteristics are similar), the terminal may receive shared weights of the learning algorithm of the another terminal, and may update the learning algorithm of the terminal based on the received weights, so as to quickly design the learning algorithm of the terminal. Terminals having completed designing of the learning algorithm may transmit feature information and weights of the designed learning algorithm to the base station via higher layer signaling. The terminal may transmit the feature information and the weights of the designed learning algorithm to the base station in advance via higher layer signaling in an RRC idle state. The terminal having received the shared weights of the learning algorithm may configure the weights of the learning algorithm of the terminal by using the shared weights, and may update the learning algorithm, in which the shared weights are configured, based on the RSs for cell-specific learning or terminal-specific learning, which are received from the base station.

Figure 16:
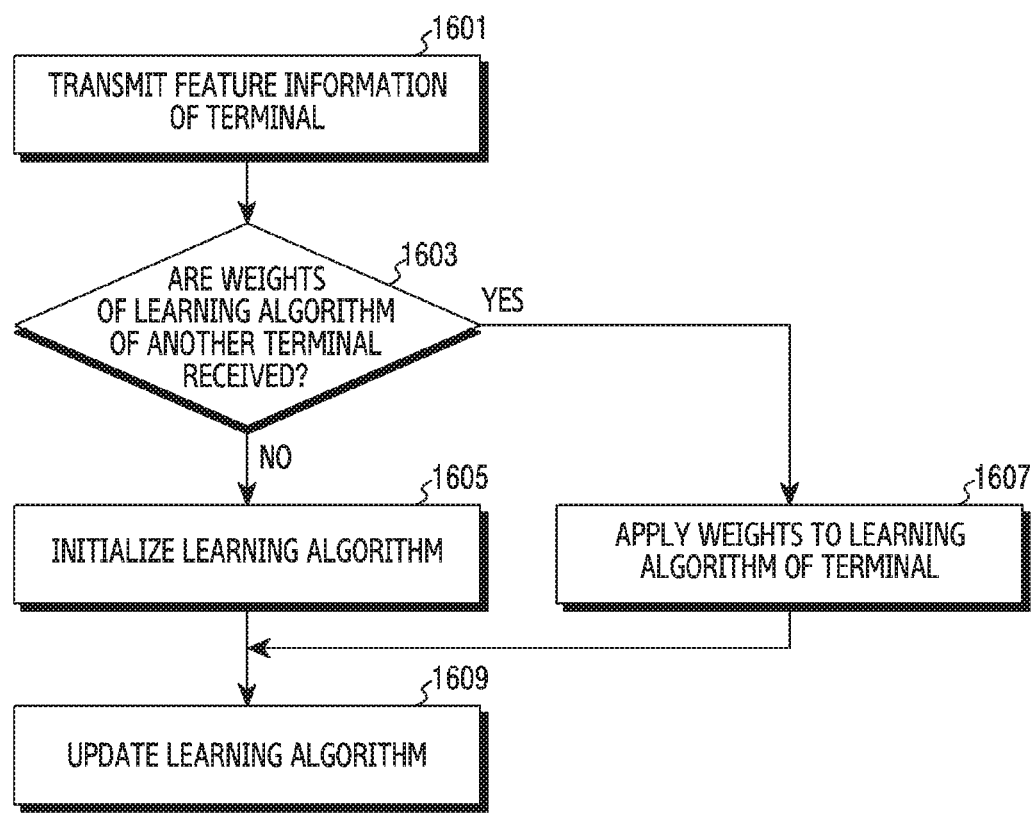
FIG. 16 illustrates a flowchart of the terminal for supporting learning in the wireless communication system, according to an embodiment.

FIG. 16 illustrates a flowchart of the terminal for supporting learning in the wireless communication system, according to an embodiment. FIG. 16 illustrates an operation method of the terminal 120.

Referring to FIG. 16, at step 1601, the terminal may transmit feature information of the terminal to a base station. The terminal may estimate channel values in time intervals so as to identify channel characteristics and/or distributions of the channel values, and may acquire feature information of the terminal, which reflects the channel characteristics and/or distributions of the channel values. The terminal may transmit the feature information to the base station in an RRC idle state via higher layer signaling.

At step 1603, the terminal may determine whether weights of a learning algorithm of another terminal are received. The terminal may determine whether the base station shares the weights of the learning algorithm of the another terminal, which correspond to the feature information of the another terminal, which is similar to the feature information of the terminal.

If the weights of the learning algorithm of the another terminal are not received, the terminal may initiate the learning algorithm at step 1605. In other words, the terminal may randomly generate weights, and may configure the generated weights as initial weights of the learning algorithm.

If the weights of the learning algorithm of the another terminal are received, the terminal may apply the received weights to the learning algorithm of the terminal at step 1607. In other words, the terminal may configure the weights of the learning algorithm of the terminal by using the received weights.

At step 1609, the terminal may update the learning algorithm. The terminal may update the learning algorithm, in which the initialized weights or the weights received from the base station are configured, based on the received RSs.

Figure 17:
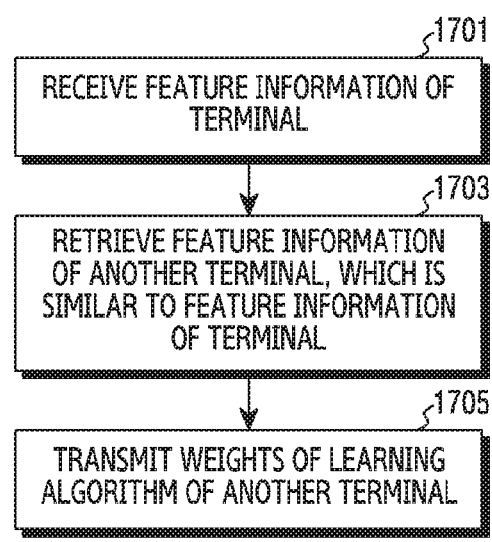
FIG. 17 illustrates a flowchart of the base station for supporting learning in the wireless communication system, according to an embodiment.

FIG. 17 illustrates a flowchart of the base station for supporting learning in the wireless communication system, according to an embodiment. FIG. 17 illustrates an operation method of the base station 110.

Referring to FIG. 17, at step 1701, the base station receives feature information of a terminal. The base station may receive feature information of the terminal, which reflects channel characteristics and/or distributions of channel values from the terminal via higher layer signaling.

At step 1703, the base station may retrieve feature information of another terminal, which is similar to the feature information of the terminal. The base station may retrieve feature information of another terminal, which is similar to the feature information of the terminal, in feature information of one or more other terminals stored in a memory of the base station.

At step 1705, the base station may transmit weights of a learning algorithm of the another terminal to the terminal. The base station may retrieve the feature information of the another terminal, which is similar to the feature information of the terminal, in the memory of the base station, and may transmit, to the terminal, the weights of the learning algorithm of the another terminal, which correspond to the retrieved feature information of the another terminal.

Figure 18:
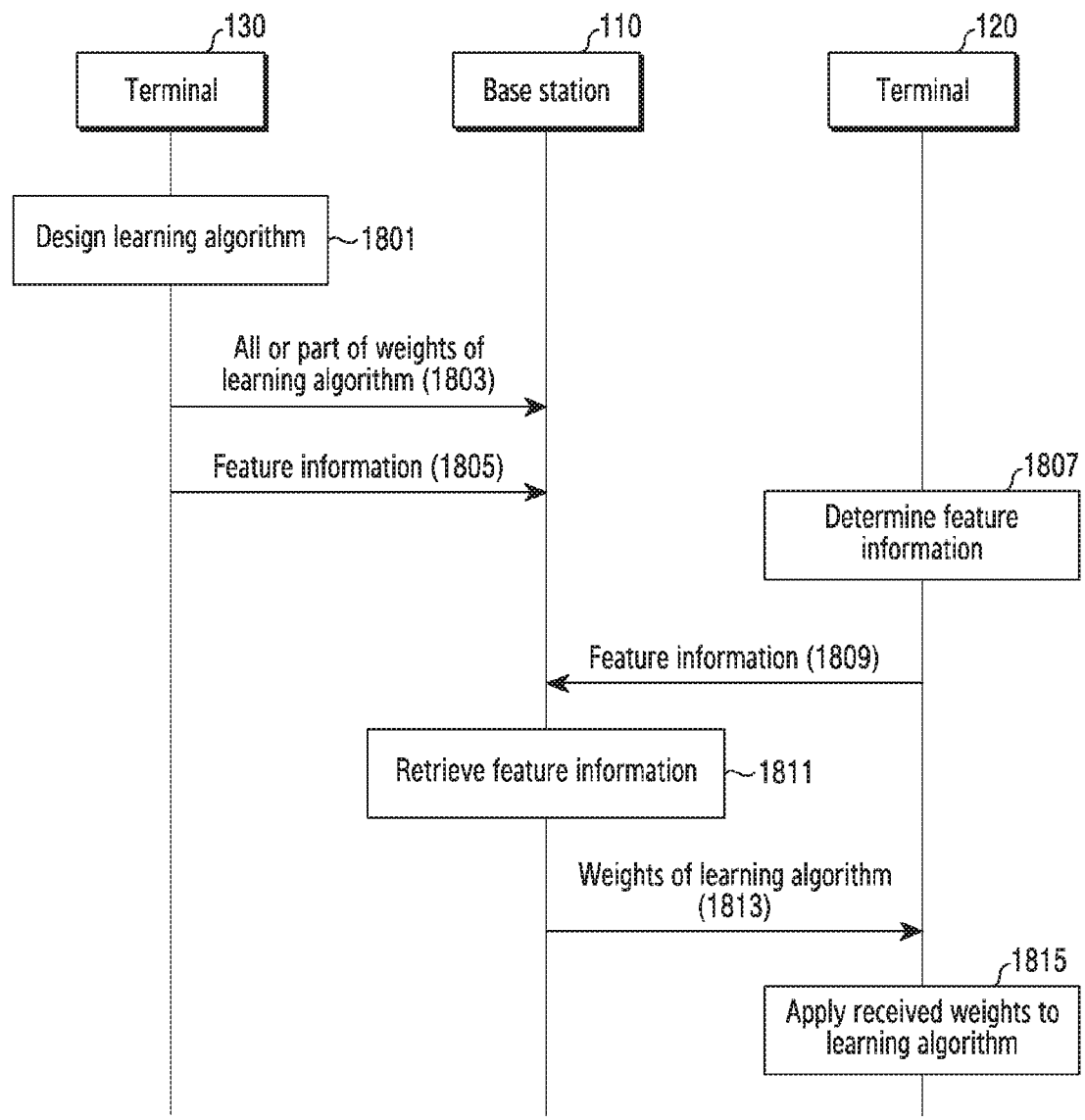
FIG. 18 illustrates a signal flowchart between the base station and the terminal for supporting learning in the wireless communication system, according to an embodiment.

FIG. 18 illustrates a signal flowchart between the base station and the terminal for supporting learning in the wireless communication system, according to an embodiment.

Referring to FIG. 18, at step 1801, the terminal 130 may design a learning algorithm. The terminal 130 may determine a valid learning algorithm and/or weights of the valid learning algorithm according to iterative updating of the learning algorithm or verification of the learning algorithm.

At step 1803, the terminal 130 may transmit all or a part of the weights of the learning algorithm to the base station 110. The terminal 130 may transmit, in advance, all or a part of the weights of the learning algorithm to the base station 110 via higher layer signaling, in an RRC idle state. The base station 110 may store the received weights of the learning algorithm of the terminal 130 in the memory of the base station.

At step 1805, the terminal 130 may transmit feature information of the terminal 130 to the base station 110. The terminal 130 may estimate channel values in time intervals so as to identify channel characteristics and/or distributions of the channel values, and may acquire the feature information of the terminal, which reflects the channel characteristics and/or distributions of the channel values. The terminal 130 may transmit the feature information of the terminal 130 to the base station 110 via higher layer signaling in an RRC idle state. The base station 110 may store the feature information of the terminal 130 in the memory of the base station 110, and may associate the feature information of the terminal 130 with weights of the learning algorithm of the terminal 130.

At step 1807, the terminal 120 may determine feature information of the terminal 120. The terminal 120 may estimate channel values in time intervals so as to identify channel characteristics and/or distributions of the channel values, and may acquire the feature information of the terminal 120, which reflects the channel characteristics and/or distributions of the channel values.

At step 1809, the terminal 120 may transmit the feature information of the terminal 120 to the base station 110. The terminal 120 may transmit the feature information of the terminal 120 to the base station 110 via higher layer signaling in the RRC idle state. The base station 110 may receive the feature information of the terminal 120, and may store the received feature information of the terminal 120 in the memory of the base station 110.

At step 1811, the base station 110 may retrieve feature information. More specifically, the base station 110 may retrieve the feature information of the terminal 130, which is similar to the feature information of the terminal 120, in feature information of one or more terminals stored in the memory of the base station 110.

At step 1813, the base station 110 may transmit weights of the learning algorithm of the terminal 130 to the terminal 120. The base station 110 may identify the weights of the learning algorithm of the terminal 130, which correspond to the retrieved feature information of the terminal 130, and may transmit the weights of the learning algorithm of the terminal 130 to the terminal 120.

At step 1815, the terminal 120 may apply the received weights to a learning algorithm of the terminal 120. The terminal 120 may configure weights of the learning algorithm of the terminal 120 by using the received weights. The terminal 120 may receive RSs from the base station 110, may estimate channel values based on the RSs, and may update the learning algorithm, in which the received weights are configured, based on the estimated channel values.

In FIG. 18, it has been described that step 1803 is performed before step 1805, but this is exemplary, and step 1805 may be performed before step 1803, or steps 1803 and 1805 may be performed simultaneously.

A terminal may perform direct communication with another terminal without going through a base station. The terminal may transmit, to another terminal via a sidelink, information including at least one of an identifier of the terminal, feature information of the terminal, or an identifier indicating to request learning support, or may receive such information from another terminal. Upon reception of an identifier for requesting learning support from another terminal, the terminal may determine whether received feature information of the another terminal is similar to feature information of the terminal, and if the received feature information of the another terminal is similar to the feature information of the terminal, the terminal may transmit weights of a learning algorithm corresponding to the feature information of the terminal, to the another terminal identified according to the identifier of the another terminal.

In order to perform channel forecasting using a learning algorithm, a terminal needs to verify whether an updated learning algorithm has sufficient forecast accuracy. If periodic cell-specific learning is performed, the terminal may determine forecast accuracy of the learning algorithm by using RSs for a learning phase of periodic cell-specific learning. The terminal may verify the forecast accuracy of the learning algorithm based on comparison between a channel value estimated based on the RSs and a forecasted channel value. The terminal may determine whether the learning algorithm is valid, and if the learning algorithm is invalid, the terminal may transmit an RSDI and/or an RSR to the base station so as to request to update the learning algorithm and may feed back channel forecast information to the base station. In order to determine validity of the learning algorithm, the following detailed embodiments may be considered A terminal may determine validity of a learning algorithm in each RS transmission period of a learning phase for periodic cell-specific learning or RS transmission period in a case where no learning phase is performed. While channel forecasting is being performed, if a change occurs in a channel environment, the terminal may request a base station to update the learning algorithm. Therefore, performance degradation due to a change in the channel environment may be prevented.

A terminal may not determine whether a learning algorithm is valid while performing channel forecasting, and a duration in which the terminal performs channel forecasting or a duration in which the terminal does not verify validity of the learning algorithm may be referred to as a CFT. The terminal does not transmit an RSDI and/or an RSR during the CFT, and therefore feedback overhead may be reduced.

If an updated learning algorithm is determined to be valid for channel forecasting, the terminal may perform channel forecasting so as to forecast a channel value for a time interval in which no RS is transmitted. Therefore, the terminal may acquire, in advance, channel forecast information (e.g., SINR and CSI) for the time interval in which no RS is transmitted. The terminal may transmit, to the base station, not only CSI derived from a channel estimation value but also channel forecast information acquired via channel forecasting. A method for feedback of channel forecast information may include the following.

A terminal may receive RSs, and may periodically transmit channel forecast information for time intervals until subsequent RSs are received, to a base station on the basis the received RSs. In other words, the terminal may periodically transmit the channel forecast information to the base station according to a reporting period of channel forecasting, or may transmit the channel forecast information to the base station in a time interval determined according to the reporting period of channel forecasting.

A terminal may acquire channel forecast information and may aperiodically feed back the channel forecast information to a base station whenever there exists a change in the channel forecast information. In other words, the terminal may aperiodically transmit the channel forecast information to the base station in response to a determination that the channel forecast information is different from the previous channel forecast information.

Figure 19:
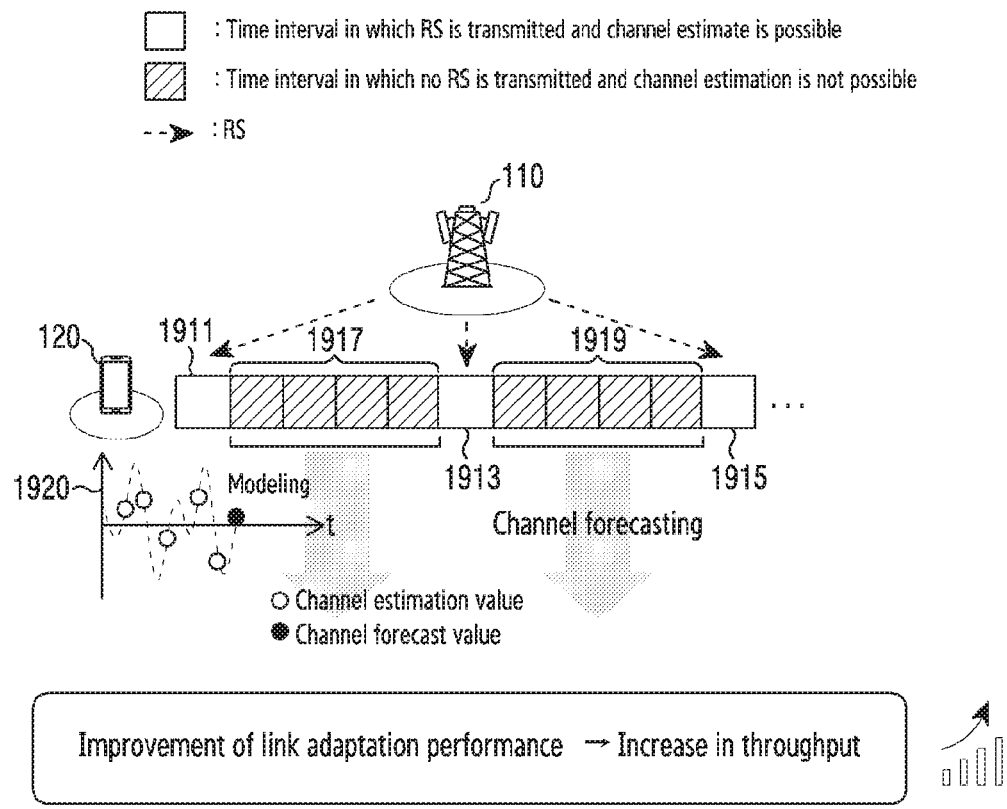
FIG. 19 illustrates an effect of channel forecasting based on a learning algorithm in the wireless communication system, according to an embodiment.

FIG. 19 illustrates an effect of channel forecasting based on a learning algorithm in the wireless communication system, according to an embodiment.

Referring to FIG. 19, the terminal 120 may receive RSs from the base station 110 in time intervals 1911, 1913, and 1915, and may acquire channel estimation values for the time intervals 1911, 1913, and 1915 based on the received RSs. Further, the terminal 120 may apply a learning algorithm to the channel estimation value for at least one of the time intervals 1911, 1913, and 1915, thereby acquire a channel forecast value for the time interval 1917 and/or time interval 1919, in which no RS is transmitted. The terminal 120 may model or design the learning algorithm based on the RSs transmitted from the base station 110 according to a learning phase, and may acquire a channel forecast value by applying the designed learning algorithm to the channel estimation values, as illustrated in a graph 1920. In the graph 1920, the horizontal axis may be time, and the vertical axis may be a channel value.

Accordingly, the terminal 120 may improve link adaptive performance by performing channel forecasting for time intervals (e.g., the time interval 1917 and/or the time interval 1919) in which no RS is transmitted, by using the learning algorithm. In other words, the terminal 120 may acquire channel forecast information for time intervals in which no RS is transmitted, and may feed back the channel forecast information to the base station, thereby improving link adaptive performance and increasing throughput.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

A method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   identifying whether a channel forecast value is valid, the channel forecast value being acquired based on applying a learning algorithm to an input comprising channel values estimated based on first reference signals (RSs) received from a base station;
   transmitting, to the base station, an RS request message for requesting an update of the learning algorithm, based on the determining that the channel forecast value is invalid;
   receiving, from the base station, second RSs of an RS density determined based on the RS request message;
   generating an updated learning algorithm based on channel values estimated from the second RSs; and
   transmitting channel forecast information acquired based on the updated learning algorithm to the base station.

2. The method of claim 1, further comprising:
   determining a required RS density based on a difference between the channel forecast value and a channel value estimated in a time interval related to the channel forecast value, wherein the RS request message comprises an RS density indicator (RSDI) indicating the required RS density, and the receiving of the second RSs from the base station comprises receiving second RSs of the required RS density from the base station in an RS transmission period determined based on the RSDI.

3. The method of claim 1, wherein the RS request message comprises an RS request (RSR) indicating that the learning algorithm is required to be updated; and
   receiving the second RSs from the base station comprises receiving second RSs of a preconfigured RS density corresponding to the RSR from the base station in a preconfigured RS transmission period corresponding to the RSR.

4. The method of claim 1, wherein the RS request message comprises at least one of an RS density indicator (RSDI) indicating a required RS density or an RS request (RSR) indicating that the learning algorithm is required to be updated; and
   the method further comprises, when the RS density indicated by the RSDI is greater than or equal to a threshold RS density, or the number of times the RSR is transmitted is greater than or equal to a threshold value, receiving, from the base station, a stop flag for requesting at least one of stopping the update of the learning algorithm or stopping channel forecasting.

5. The method of claim 1, wherein the RS density and an RS transmission period are determined based on an RS request message transmitted from the terminal and an RS request message transmitted from one or more other terminals in a cell of the base station; and
   the method further comprises receiving the determined RS transmission period and an index indicating an RS configuration comprising the determined RS density from the base station, wherein the receiving of the second RSs from the base station comprises receiving the second RSs of the RS density from the base station in the RS transmission period based on the index, and the second RSs of the RS density are transmitted from the base station to the one or more other terminals in the RS transmission period based on the index.

6. The method of claim 1, wherein the RS density is determined based on an RS request message transmitted from the terminal and an RS request message transmitted from one or more other terminals in a cell of the base station; and
   the method further comprises receiving information comprising an indicator indicating that an RS is transmitted in a time interval and an index indicating an RS configuration including the determined RS density from the base station in the time interval, wherein the receiving of the second RSs from the base station comprises receiving the second RSs of the RS density from the base station in the time interval based on the information, and the second RSs of the RS density are transmitted from the base station to the one or more other terminals in the time interval based on the index.

7. The method of claim 1, wherein the input comprises feature information of the terminal, and the feature information comprises at least one of the position of the terminal, the mobility of the terminal, whether the terminal is positioned indoors or outdoors, or whether the terminal is positioned at a cell center or a cell boundary; and
   the method further comprises, before determining whether the channel forecast value is valid, transmitting the feature information of the terminal to at least one of the base station or another terminal;
   receiving, from at least one of the base station or the another terminal, weights of a learning algorithm corresponding to feature information of the another terminal, in which a feature difference with respect to the feature information of the terminal falls within a threshold range; and
   acquiring the channel forecast value by applying the received weights to the input.

8. A method performed by a base station in a wireless communication system, the method comprising:
   transmitting first reference signals (RSs) to a terminal;
   receiving, from the terminal, an RS request message for requesting an update of a learning algorithm when a channel forecast value is invalid, the channel forecast value being acquired by applying the learning algorithm to an input comprising channel values estimated based on the first RSs;
determining an RS density based on the RS request message;
transmitting second RSs of the RS density for updating the learning algorithm to the terminal; and
receiving, from the terminal, channel forecast information acquired based on the updated learning algorithm.

9. The method of claim 8, wherein the RS request message comprises an RS density indicator (RSDI) indicating a required RS density;
determining the RS density based on the RS request message comprises determining the required RS density and an RS transmission period based on the RSDI;
transmitting the second RSs to the terminal comprises transmitting second RSs of the required RS density to the terminal in the RS transmission period; and
the required RS density is determined based on a difference between the channel forecast value and a channel value estimated in a time interval related to the channel forecast value.

10. The method of claim 8, wherein the RS request message comprises an RS request (RSR) indicating that the learning algorithm is required to be updated;
determining the RS density based on the RS request message comprises identifying a preconfigured RS density and a preconfigured RS transmission period, which correspond to the RSR; and
transmitting the second RSs to the terminal comprises transmitting second RSs of the preconfigured RS density to the terminal in the preconfigured RS transmission period.

11. The method of claim 8, wherein the RS request message comprises at least one of an RS density indicator (RSDI) indicating a required RS density or an RS request (RSR) indicating that the learning algorithm is required to be updated; and
the method further comprises, when the RS density indicated by the RSDI is greater than or equal to a threshold RS density, or the number of times the RSR is transmitted is greater than or equal to a threshold value, transmitting, to the terminal, a stop flag for requesting at least one of stopping the update of the learning algorithm or stopping channel forecasting.

12. The method of claim 8, wherein determining the RS density comprises determining the RS density and an RS transmission period based on an RS request message received from the terminal and an RS request message received from one or more other terminals in a cell of the base station; and
the method further comprises transmitting the RS transmission period and an index indicating an RS configuration including the RS density to the terminal, wherein the transmitting of the second RSs to the terminal comprises transmitting the second RSs of the RS density to the terminal and the one or more other terminals in the RS transmission period based on the index.

13. A terminal in a wireless communication system, the terminal comprising:
at least one transceiver;
at least one processor operably coupled to the at least one transceiver and configured to:
identify whether a channel forecast value is valid, the channel forecast value being acquired based on applying a learning algorithm to an input comprising channel values estimated based on first reference signals (RSs) received from a base station; and
transmit, to the base station, an RS request message for requesting an update of the learning algorithm, based on determining that the channel forecast value is invalid,
receive, from the base station, second RSs of an RS density determined based on the RS request message,
generate an updated learning algorithm based on channel values estimated from the second RSs, and
transmits channel forecast information acquired based on the updated learning algorithm to the base station.

14. The terminal of claim 13, wherein the at least one processor is further configured to determine a required RS density based on a difference between the channel forecast value and a channel value estimated in a time interval related to the channel forecast value, the RS request message comprises an RS density indicator (RSDI) indicating the required RS density; and
receive second RSs of the required RS density from the base station in an RS transmission period determined based on the RSDI.

15. The terminal of claim 13, wherein the RS request message comprises an RS request (RSR) indicating that the learning algorithm is required to be updated; and
wherein the at least one processor is further configured to receive second RSs of a preconfigured RS density corresponding to the RSR from the base station in a preconfigured RS transmission period corresponding to the RSR.

16. The terminal of claim 13, wherein the RS request message comprises at least one of an RS density indicator indicating a required RS density or an RS request (RSR) indicating that the learning algorithm is required to be updated; and
wherein the at least one processor is further configured to:
when the RS density indicated by the RSDI is greater than or equal to a threshold RS density, or the number of times the RSR is transmitted is greater than or equal to a threshold value, receive, from the base station, a stop flag for requesting at least one of stopping the update of the learning algorithm or stopping channel forecasting.

17. The terminal of claim 13, wherein the RS density and an RS transmission period are determined based on an RS request message transmitted from the terminal and an RS request message transmitted from one or more other terminals in a cell of the base station;
wherein the at least one processor is further configured to receive, from the base station, the determined RS transmission period and an index indicating an RS configuration including the determined RS density, and receive the second RSs of the RS density from the base station in the RS transmission period based the index; and
wherein the second RSs of the RS density are transmitted from the base station to the one or more other terminals in the RS transmission period based on the index.

18. The terminal of claim 13, wherein the RS density is determined based on an RS request message transmitted from the terminal and an RS request message transmitted from one or more other terminals in a cell of the base station;
wherein the at least one processor is further configured to receive information comprising an indicator indicating that an RS is transmitted in a time interval and an index indicating an RS configuration including the determined RS density, from the base station in the time interval, and receive the second RSs of the RS density from the base station in the time interval based on the information; and wherein the second RSs of the RS density are transmitted from the base station to the one or more terminals in the time interval based on the index.

19. The terminal of claim 13, wherein the input comprises feature information of the terminal;

wherein the feature information comprises at least one of the position of the terminal, the mobility of the terminal, whether the terminal is positioned indoors or outdoors, or whether the terminal is positioned at a cell center or a cell boundary;

wherein the at least one processor is further configured to:

transmit, before determination of whether the channel forecast value is valid, the feature information of the terminal to at least one of the base station or another terminal, and receive, from at least one of the base station or the another terminal, weights of a learning algorithm corresponding to feature information of the another terminal, in which a feature difference with respect to the feature information of the terminal falls within a threshold range; and acquire the channel forecast value by applying the received weights to the input.

20. The terminal of claim 13, wherein the at least one processor is further configured to determines whether the channel forecast value is valid, periodically according to an RS transmission period in which the first RSs are transmitted.

* * * * *